(12) United States Patent
Dalmia et al.

(10) Patent No.: US 10,395,177 B2
(45) Date of Patent: Aug. 27, 2019

(54) OPTIMIZED EXECUTION ORDER CORRELATION WITH PRODUCTION LISTING ORDER

(71) Applicant: Microsoft Technology Licensing, LLC, Redmond, WA (US)

(72) Inventors: Anurag Dalmia, Bellevue, WA (US); Ganesh Krishnamurthi, Bangalore (IN); fnu Suresh Kumar Koorella, Redmond, WA (US); Himanshu Agrawal, Bellevue, WA (US); Vivek Dalvi, Redmond, WA (US); Alok Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 794 days.

(21) Appl. No.: 14/992,100

(22) Filed: Jan. 11, 2016

(65) Prior Publication Data

US 2017/0169339 A1    Jun. 15, 2017

(30) Foreign Application Priority Data

Dec. 10, 2015  (IN) .......................... 6619/CHE/2015

(51) Int. Cl.
*G06N 5/04*         (2006.01)
(52) U.S. Cl.
CPC .................... *G06N 5/047* (2013.01)
(58) Field of Classification Search
USPC .......................................................... 706/47
See application file for complete search history.

(56) References Cited

U.S. PATENT DOCUMENTS

| 6,415,275 | B1 | 7/2002 | Zahn |
| 6,487,715 | B1 | 11/2002 | Chamdani et al. |
| 7,308,465 | B2 | 12/2007 | Miller |
| 7,444,314 | B2 | 10/2008 | Rouvellou et al. |

(Continued)

OTHER PUBLICATIONS

Experimental assessment of combining pattern matching strategies with VIATRA2 Ákos Horváth, Gábor Bergmann, István Ráth, Dániel Varró Apr. 11, 2010 pp. 211-230.*

(Continued)

*Primary Examiner* — Michael B Holmes
(74) *Attorney, Agent, or Firm* — Ogilvie Law Firm

(57) ABSTRACT

Optimized execution order results (e.g., from a Rete algorithm graph) are correlated with a production ordering selected by a user, thereby more accurately modeling the user's understanding of how productions relate to one another during execution in a rule system. An execution report shows in the user-selected order for each of the rules, whether the rule was executed, the inputs matched to partial conditions of the rule, and partial condition evaluation results. User rule management experience is also enhanced in other ways. For example, a graphical user interface permits user selection of a schema xpath, bulk selection of XML schema nodes to define vocabulary used in rules, if-then-else rules, rules with embedded SQL, marking rules as active or not, receiving multiple kinds of input from a single text input box, locally executing rules, importing rules authored elsewhere, iterating over a collection of objects, and validating rules against vocabulary data types.

20 Claims, 9 Drawing Sheets

(56) References Cited

U.S. PATENT DOCUMENTS

| | | | |
|---|---|---|---|
| 7,809,666 B2 | 10/2010 | Citeau | |
| 7,853,546 B2 | 12/2010 | Damodharan | |
| 8,131,663 B1 | 3/2012 | Taylor | |
| 8,140,362 B2 | 3/2012 | Deshpande et al. | |
| 8,402,064 B2* | 3/2013 | Addala | G06F 17/30 707/797 |
| 8,413,088 B1* | 4/2013 | Armbruster | G06F 17/504 716/100 |
| 8,510,792 B2* | 8/2013 | Krishnamurthi | H04L 43/026 380/239 |
| 8,612,905 B1* | 12/2013 | Goyal | G06F 17/504 716/106 |
| 8,676,737 B2 | 3/2014 | Junker | |
| 8,689,175 B2 | 4/2014 | Matsumoto | |
| 8,713,012 B2 | 4/2014 | Martino et al. | |
| 8,813,235 B2 | 8/2014 | Sidagni | |
| 8,949,411 B2* | 2/2015 | Tiwari | H04L 61/2007 709/224 |
| 8,990,746 B1* | 3/2015 | Goyal | G06F 17/5022 716/106 |
| 9,106,763 B2* | 8/2015 | Coleman | G06Q 30/0242 |
| 9,213,624 B2* | 12/2015 | Nair | G06F 11/3664 |
| 10,268,477 B1* | 4/2019 | Desai | G06F 8/73 |
| 2003/0221184 A1 | 11/2003 | Gunjal et al. | |
| 2008/0071736 A1 | 3/2008 | Smith | |
| 2012/0158944 A1* | 6/2012 | Tiwari | H04L 61/2007 709/224 |
| 2013/0326465 A1* | 12/2013 | Jain | G06F 8/77 717/100 |
| 2013/0326467 A1* | 12/2013 | Nair | G06F 11/3664 717/101 |
| 2014/0067450 A1 | 3/2014 | Malkin et al. | |
| 2014/0122377 A1 | 5/2014 | Goodman et al. | |
| 2014/0189526 A1 | 7/2014 | Chen et al. | |
| 2017/0169339 A1* | 6/2017 | Dalmia | G06N 5/025 |

OTHER PUBLICATIONS

ScienceDirect Elsevier The Journal of Logic Programming vol. 3, Issue 3, Oct. 1986, pp. 237-258 Natural deduction as higher-order resolution.*

IEEE Sequel 2: A Unified Approach to Data Definition, Manipulation, and Control, D. D. Chamberlin; M. M. Astrahan; K. P. Eswaran; P. P. Griffiths; R. A. Lode; J. W. Mehl; P. Reisner; B. W. Wade IBM Research Laboratory, pp. 560-575 IEEE.*

IEEE Data mining with an ant colony optimization algorithm R.S. Parpinelli; H.S. Lopes; A.A. Freitas Published in: IEEE Transactions on Evolutionary Computation ( vol. 6 , Issue: 4 , Aug. 2002 ) pp. 321-332.*

IEEE Product configuration frameworks—a survey D. Sabin; R. Weigel Published in: IEEE Intelligent Systems and their Applications (vol. 13 , Issue: 4 , Jul./Aug. 1998) pp. 42-49.*

Dalmia, Anurag., "BizTalk Rules", retrieved from <<https://azure.microsoft.com/en-in/documentation/articles/app-service-logic-use-biztalk-rules/>>, Feb. 7, 2015, 17 pages.

Delima, Neil, "Leveraging reference data for business rule authoring in IBM Operational Decision Manager using an XML dynamic domain", retrieved from <<http://www.ibm.com/developerworks/bpm/ppmjournal/1308_delima/1308_delima.html>>, Aug. 28, 2013, 33 pages.

"4 Using XML Facts with Rule Author", retrieved from <<http://docs.oracle.com/cd/E11036_01/web.1013/b28965/xmlrules.htm>>, copyright 2005, 2006, 21 pages.

"Authoring Business Rules in IBM WebSphere ILOG Rule Team Server V7.1 (WB310G)", retrieved from <<http://www.globalknowledge.com/training/course.asp?pageid=98,courseid=21162&catid=581&country=United+States>>, no later than Aug. 19, 2015, 2 pages.

Spreeuwenberg, Silvie., "Rule Authoring Is a Creative Process", in Business Rules Journal, vol. 10, No. 9, Sep. 2009, 4 pages.

"Walkthrough: Creating a Simple Business Policy", retrieved from <<https://msdn.microsoft.com/en-us/library/aa995540.aspx>>, 2014, 7 pages.

"Walkthrough: Creating and Using a Vocabulary in the Policy", retrieved from <<https://msdn.microsoft.com/en-us/library/Aa995545.aspx>>, 2014, 7 pages.

"RetePlus mode", retrieved from <<https://www-01.ibm.com/support/knowledgecenter/SSQP76_8.7.0/com.ibm.odm.dserver.rules.designer.run/optimizing_topics/con_opt_execmodes_reteplus.html>>, no later than Nov. 9, 2015, 2 pages.

"Oracle® Fusion Middleware Rules Language Reference for Oracle Business Process Management", retrieved from <<https://docs.oracle.com/middleware/1213/bpm/rules-reference/nonretealgorithm.htm#RLJAR349>>, no later than Sep. 9, 2015, 4 pages.

"Improve performance for IBM Operational Decision Manager, Part 1: Reduce rule execution time", retrieved from <<http://www.ibm.com/developerworks/bpm/bpmjournal/1503_siddiqui1/1503_siddiqui1.html>>, Mar. 25, 2015, 16 pages.

"The FICO Blaze Advisor Business Rules Management System", retrieved from <<http://www.fico.com/en/wp-content/secure_upload/Blaze_Advisor_How_It_Works_6_5_1262WP.pdf>>, 2011, 39 pages.

Ding Xiao, et al., "The Improvement for Rete Algorithm", retrieved from <<http://ieeexplore.ieee.org/stamp/stamp.jsp?arnumber=5454996>>, 2009, 4 pages.

James L. Crowley, "Intelligent Systems: Reasoning and Recognition", retrieved from <<http://www-prima.imag.fr/Prima/jlc/Courses/2013/ENSI2.SIRR/ENS12.SIRR.S7.pdf>>, Mar. 12, 2014, 16 pages.

"The Rule IDE (Eclipse)", retrieved from <<https://docs.jboss.org/drools/release/5.2.0.Final/drools-expert-docs/html/ch08.html>>, no later than Sep. 9, 2015, 20 pages.

"Working with Rulesets and Rules", retrieved from <<http://docs.oracle.com/cd/E23943_01/user.1111/e10228/rules_start.htm#ASRUG300>>, no later than Sep. 9, 2015, 76 pages.

Anurag Dalmia, "BizTalk Rules", retrieved from <<http://integrate2014.com/sessions/>>, Dec. 2014, 55 pages.

"Decision table", retrieved from <<https://en.wikipedia.org/wiki/Decision_table>>, Oct. 19, 2015, 4 pages.

"Cloud computing", retrieved from <<https://en.wikipedia.org/wiki/Cloud_computing>>, Oct. 31, 2015, 18 pages.

"Microsoft BizTalk Server", retrieved from <<https://en.wikipedia.org/wiki/Microsoft_BizTalk_Server>>, Sep. 2, 2015, 4 pages.

"Business process management", retrieved from <<https://en.wikipedia.org/wiki/Business_process_management>>, Oct. 27, 2015, 10 pages.

"Production system (computer science)", retrieved from <<https://en.wikipedia.org/wiki/Production_system_(computer_science)>>, Apr. 24, 2015, 5 pages.

"Rete algorithm", retrieved from <<https://en.wikipedia.org/wiki/Rete_algorithm>>, Aug. 5, 2015, 11 pages.

"The difference between RetePlus, Sequential and Fastpath algorithms in IBM ODM", retrieved from <<http://ask.ozar.net/19/difference-between-reteplus-sequential-fastpath-algorithms>>, Oct. 31, 2013, 2 pages.

"The #1 Integration Cloud | Boomi", retrieved from <<http://www.boomi.com/integration>>, Aug. 27, 2015, 3 pages.

Jeff Marin, "Business Rules Engines with Drools: A Tutorial | Toptal", retrieved from <<http://www.toptal.com/java/rules-engines-power-to-the-smeople>>, Aug. 27, 2015, 10 pages.

"Business Rule Management Software and Services", retrieved from <<http://www.inrule.com/products/>>, Aug. 27, 2015, 3 pages.

"How to Develop Vocabularies", retrieved from <<https://msdn.microsoft.com/en-us/library/aa560360.aspx>>, Mar. 24, 2015, 1 page.

"Windows of the Business Rule Composer", retrieved from <<https://msdn.microsoft.com/en-us/library/aa561030.aspx>>, Aug. 24, 2015, 2 pages.

"BizTalk Server Business Rules Framework", retrieved from <<https://msdn.microsoft.com/en-us/library/dd879260(v=bts.10).aspx>>, May 3, 2005, 8 pages.

* cited by examiner

Fig. 8

| POLICIES<br>InsuranceClaims | v x | INSURANCE<br>InsuranceClaims<br>1102 | v x | TEST POLICY<br>Insurance<br>1104 | v x |
|---|---|---|---|---|---|
| Name Status #Rules | | Name Details | | Defns Types In Out — 1106<br><br>— 1108 | |

Fig. 11

OPTIMIZED EXECUTION ORDER CORRELATION WITH PRODUCTION LISTING ORDER

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A production system, sometimes also called a "production rule system", is a computing system which operates by checking trigger conditions defined in productions (also called "rules") and then taking corresponding actions when the trigger conditions are met. Production rule systems are used, for example, in expert systems, business process management, automated planning, and other fields. Productions typically consist of two parts: a trigger condition (sometimes called the "IF portion" or "IF statement") and a corresponding group of one more actions (also called the "THEN portion"). The trigger conditions typically involve a set of variables, sometimes called "working memory", which contain data (sometimes called "facts" or "data tuples") representing the states of pertinent real-world items. A rule engine (sometimes called a "rule interpreter") compares the variables in working memory to the trigger conditions, fires rules whose trigger conditions are met, and takes the corresponding actions. It is not unusual for a taken action to modify the state of working memory, which may lead in turn to other rules being triggered, or to the same rule being triggered again with different facts.

One naive implementation of a rule interpreter would check a rule against known facts in the working memory database, fire the rule if the trigger condition is met, and then move on to the next rule, looping back to the first rule after all rules have been checked once in this iteration of the loop. In practice, this naive approach is not very efficient because part of a condition may be evaluated more often than necessary. An algorithm for comparing working memory to trigger conditions, known as the Rete algorithm, provides a more efficient approach. A rule engine using the Rete algorithm builds a network of nodes in which each node except the root corresponds to a pattern (also referred to here as a "partial condition") in the IF portion of a rule. The path from the root node to a leaf node defines a complete rule trigger in terms of its component partial conditions. Each node has a memory of facts that satisfy the pattern, which tends to reduce the amount of evaluation performed to determine current fact values. A production's actions are still performed for each complete set of facts that match the production's conditions. Implementation of the Rete algorithm provides computing functionality that efficiently matches facts against productions in a pattern-matching production system rule engine. The Rete algorithm is widely used to implement pattern-matching functionality within computing system rule engines that use a match-resolve-act cycle to support forward chaining and inferencing.

SUMMARY

Some embodiments are directed to the technical activity of blending optimized execution in a production rule engine with production ordering selected by a user, thereby more accurately modeling the user's understanding of how productions relate to one another during execution. Some embodiments are directed to the related technical activity of providing particular technical behaviors through a user interface of a cloud-based production rule system as part of a user experience. Other technical activities pertinent to teachings herein will also become apparent to those of skill in the art.

Some embodiments provide rule engine execution reporting. A set of rules is obtained in a listing order selected by the user. Each rule includes at least one partial condition and at least one action. A rule engine builds an execution structure, e.g., a Rete algorithm network of nodes, which effectively imposes an execution order on the partial conditions. Typically, the execution order is different from the listing order. During an execution of the rules according to the execution structure, information such as the following is logged in an execution log: inputs matched to partial conditions, results of evaluating partial conditions according to matched inputs, and which rule was executing when partial conditions were evaluated. An execution report derived from the rule set and the execution log correlates the optimized execution order with the user-defined listing order. For example, the execution report may show, in the listing order and for each of the rules, whether the rule was executed and also may show for each executed rule the one or more inputs matched to the one or more partial conditions of the executed rule and also may show the results of evaluating the one or more partial conditions according to the one or more matched inputs. The correlation may be accomplished with a correlation algorithm taught herein.

In some cases, one or more of the following technical behaviors is also provided through a cloud-based production rule system as part of a user experience: utilizing input from a graphical user interface to obtain a user selection of an xpath which is part of a rule in the set of rules; obtaining a rule which includes an SQL query; obtaining a rule which includes a condition, a condition-satisfied action which will be executed when the condition is satisfied, and a condition-not-satisfied action which will be executed when the condition is not satisfied; utilizing input from a graphical user interface to obtain a user selection of XML schema nodes which will define vocabulary used in one or more of the rules; utilizing input from a graphical user interface to mark rules as active or as inactive; receiving, from a single text input box of a graphical user interface, text which represents multiple kinds of input (single values, sets of values, and value ranges), and distinguishing between these kinds of input; providing a rules vocabulary in a graphical user interface; presenting a rule condition input field in the graphical user interface, the rule condition input field operationally dedicated to receiving text which describes a trigger condition for a rule; presenting a rule action input field in the graphical user interface the rule action input field operationally dedicated to receiving text which describes an action to be taken when the trigger condition is satisfied; receiving through the graphical user interface a request to test rules, and then presenting results of locally executing at least one of the rules; providing auto-completion of identifier portions which appear in parsed user input, based at least in part on dynamically retrieved user-defined vocabulary item names; displaying a tree-of-nodes representation of an XML schema, getting a user selection of multiple nodes, and generating a new vocabulary item for each selected node; receiving in an input field a name of a collection of objects, and then automatically iterating over the collection of objects passed, thereby allowing a user to avoid writing logic in the input field which handles the objects individually; receiving a text input, sending the received text to a remote server for a validation which checks validity of the received text based at least in part on user-designated vocabulary having associated data types, and obtaining and displaying a validation result; upon determining that an input device focus is hovering over a vocabulary item, displaying a definition of the vocabulary item; and/or importing rules which were previously authored in a word processor application or a spreadsheet application.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 8 is a line drawing illustrating part of a production rule system graphical user interface during technical behavior that adds multiple XML-based vocabulary item definitions, also called a "bulk add" operation herein;

FIG. 11 is a line drawing illustrating part of a production rule system graphical user interface during technical behavior that tests a set of rules, e.g., tests a policy on a local user system.

DETAILED DESCRIPTION

Acronyms and Abbreviations

Figure 1:
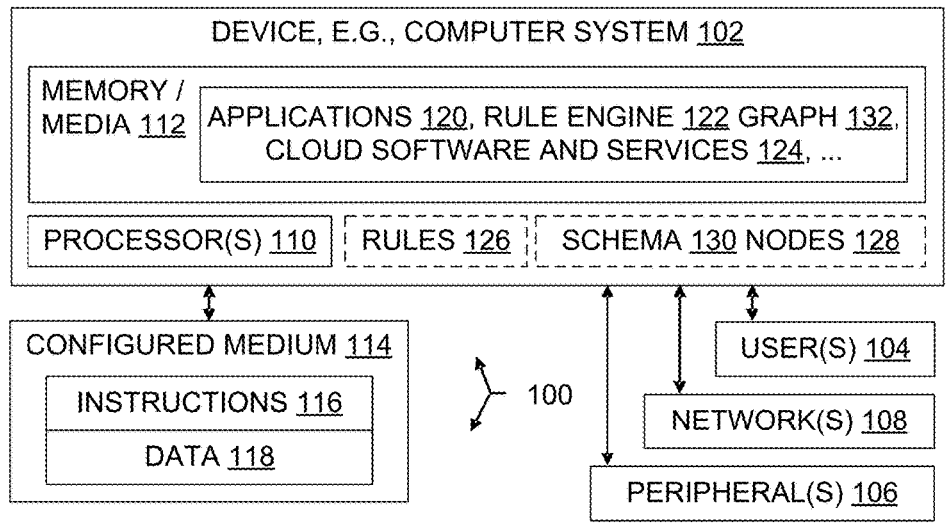
FIG. 1 is a block diagram illustrating a computer system having at least one processor and at least one memory which interact with one another under the control of production rule system software, and other items in an operating environment which may be present on multiple network nodes, and also illustrating configured storage medium (as opposed to a mere signal) embodiments.

Some acronyms and abbreviations are defined below. Others may be defined elsewhere herein or require no definition to be understood by one of skill.

ALU: arithmetic and logic unit
API: application program interface
CD: compact disc
CPU: central processing unit
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
LINQ: language-integrated query
RAM: random access memory
ROM: read only memory
SQL: structured query language
UX: user experience
XML: extensible markup language Overview Some embodiments take a rule authoring experience to the cloud, via a portal on a local machine. The portal includes a graphical user interface which supports rule entry, hints for choosing identifiers used in rules, rule testing options, and feedback from executing rules. Rule entry is supported, for example, by automatically distinguishing between different kinds of inputs, recognizing schema xpaths, validating entered conditions and actions based on vocabulary names, and importing rule text from spreadsheets or word processors. Identifier hints are given through Intellisense® auto-completion, and by supporting bulk entry of vocabulary items selected from an XML tree, among other features. Rule testing support allows marking rules active or inactive, and running them on a local device with input supplied by the user. Feedback from executing rules includes a report which shows rules in the user-defined listing order after executing them in an optimized partial condition order, such as Rete order. Other features are also provided in some embodiments.

Some embodiments described herein may be viewed in a broader context. For instance, concepts such as display, order, satisfaction, selection, and validity may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving display, order, satisfaction, selection, and/or validity are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers, including the following examples. First, some embodiments address technical activities such as matching data facts to production rule trigger conditions, and logging intermediate results during execution of a rule engine. Second, some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein correlate optimized execution order with user-selected listing order in a production rule authoring and testing system. Third, technical effects provided by some embodiments include reports which correlate Rete algorithm execution with a user-defined rule listing order. Fourth, some embodiments include technical adaptations such as a text input box functionality that distinguishes between single values, value sets, and value ranges, and a GUI functionality that displays XML tree nodes and permits selection of a subset of nodes whose data is be added as production rule vocabulary items. Fifth, technical advantages of some embodiments include improved usability of rule authoring software, e.g., by bulk add and collection iteration support, and simplified development of production rules by correlating user-defined rule listing order with rule-engine-imposed rule triggering order.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Optimize" means to improve, not necessarily to perfect. For example, it may be possible to make further improvements in a program which has been optimized. An optimization may improve performance in one way and maintain or reduce performance in other ways; it is an optimization despite the performance reduction(s), so long as it also improves performance in at least one way.

"Program" is used broadly herein, to include applications, kernels, drivers, interrupt handlers, firmware, state machines, libraries, and other code written by programmers (who are also referred to as developers).

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not necessarily part of the embodiments described herein, but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software. Similarly, operations such as matching data to production rule partial conditions, and vocabulary item bulk add are understood herein as requiring and providing speed and accuracy that are not obtainable by human mental steps. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as authoring, building, checking, correlating, defining, determining, deriving, displaying, distinguishing, emitting, evaluating, executing, generating, getting, hovering, importing, iterating, listing, logging, mapping, maintaining, marking, matching, obtaining, ordering, parsing, presenting, providing, receiving, retrieving, satisfying, selecting, sending, showing, storing, testing, triggering, validating (and authors, authored, builds, built, etc.) with regard to a destination or other subject may involve intervening action such as forwarding, copying, uploading, downloading, encoding, decoding, compressing, decompressing, encrypting, decrypting, authenticating, invoking, and so on, including listed actions, by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the *In re Nuijten* case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 are present, including for example one or more of the following: spreadsheets, word processors, accounting software, supply chain management software, web analytics software, electronic data interchange software, customer relationship management software, databases and database management software, search engines, and real-time monitors. The applications may be part of a suite, may operate independently, and/or may be integrated through use of scripts, pipes, production rules, and/or other mechanisms. Production rule integration utilizes a rule engine 122, which may for example be part of a Microsoft BizTalk® solution or other business process automation software (mark of Microsoft Corporation). The rule engine 122 operates according to production rules 126, which may be defined by or correspond to nodes 128 in a schema 130, using a Rete graph 132 or other performance-optimization structure. The system may be standalone, or may be configured for cloud computing with cloud software and services 124 such as portals, software-as-a-service, shared cloud infrastructure, virtualized hardware, and/or software implemented in a service-oriented architecture, for example.

The applications 120, rule engine 122, rules 126, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation. In addition to processors 110 (CPUs, ALUs, FPUs, and/or GPUs), memory/storage media 112, display(s), and battery(ies), an operating environment may also include other hardware, such as buses, power supplies, wired and wireless network interface cards, and accelerators, for instance, whose respective operations are described herein to the extent not already apparent to one of skill. A given display may include one or more touch screens, screens responsive to input from a pen or tablet, or screens which operate solely for output.

One of skill will appreciate that the foregoing aspects and other aspects presented herein under "Operating Environments" may also form part of a given embodiment. This document's headings are not intended to provide a strict classification of features into embodiment and non-embodiment feature classes.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Systems

Figure 2:
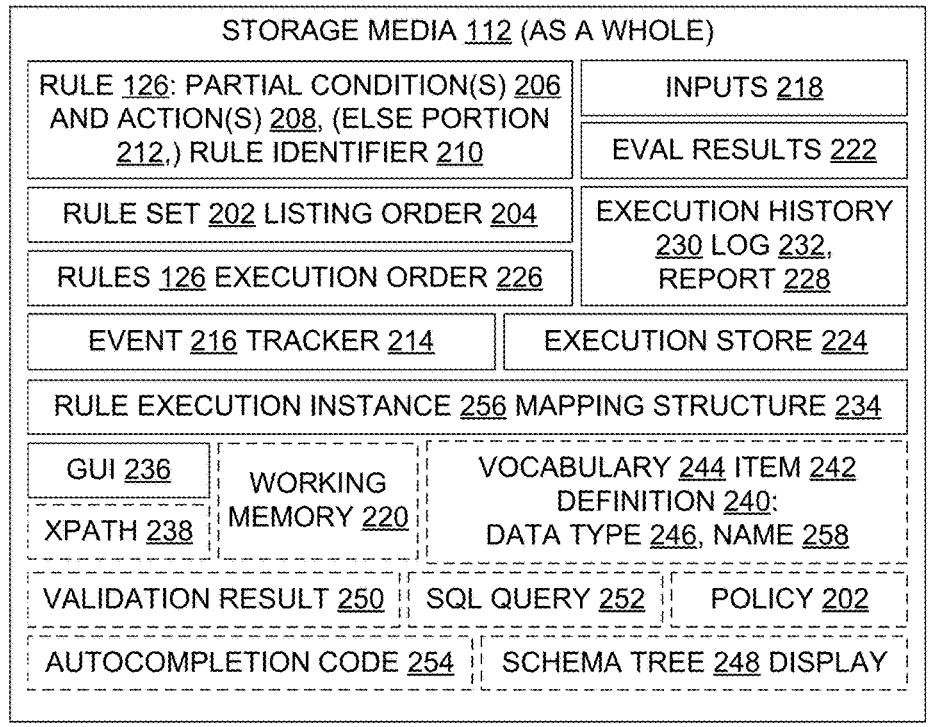
FIG. 2 is a block diagram illustrating aspects of production rule system digitally stored components and artifacts in some architectures.

FIG. 2 illustrates aspects of an architecture which is suitable for use with some embodiments. A system 102 includes at least one processor 110, and a memory 112 in operable communication with the processor. A set 202 of rules 126 listed in a listing order 204 resides in the memory. Each rule 126 includes at least one partial condition 206 and at least one action 208, and each rule 126 has a respective identifier 210.

For example, a set 202 (also called a "policy") of rules in a rule production system that is tailored to handling insurance claims might include the following rule:
ManualApproval:
If ClaimAmount is greater than AutoApprovalLimit OR TreatmentID is in SpecialTreatmentIDs
Then ClaimsStatus equals "Manual Approval Required"
Halt
In this example, ManualApproval is a rule identifier 210, the rule in question has two partial conditions 206 (If ClaimAmount is greater than AutoApprovalLimit, and TreatmentID is in SpecialTratementIDs) and one action 208 (set ClaimsStatus equal to "Manual Approval Required"). This rule, like typical production rules, has an IF-THEN form. Some rules 126 taught herein also have an ELSE portion 212, e.g.,
If TreatmentID is in SpecialTreatmentIDs OR TreatmentID is in StandardTreatmentIDs
Then TreatmentIDStatus equals "Treatment Recognized"
Else TreatmentIDStatus equals "Treatment Not Recognized"
Halt This system 102 also has a rule engine execution tracker 214, which includes software that upon execution by the processor 110 tracks execution of partial conditions 206 at least in part by reading execution events 216. Execution events 216 are emitted by the rule engine 122 as it compares partial conditions 206 to inputs 218 read from working memory 220. The resulting evaluation 222 of the partial conditions 206 based on the inputs 218 determines whether the rule in question is triggered, that is, whether the rule's actions 208 get executed. A rule execution store 224 includes software which upon execution by the processor stores rule identifiers 210 with execution event data (e.g., events 216, inputs 218, evaluation results 222) provided to the rule execution store 224 by the rule engine execution tracker 214. The store 224 may store this data in lists, tables, trees, arrays, and/or other data structures tailored to the data and the operations described herein.

In the system 102 being discussed, the rule engine 122 emits execution events 216 while executing rules 126 in an execution order 226 by matching inputs 218 to partial conditions 206, evaluating partial conditions with matched inputs, and triggering execution of rule actions 208 based on partial condition evaluation results 222. As a result of using the Rete algorithm or a variation thereof, for instance, to optimize rule engine 122 performance, the rules are executed in an execution order 226 which may differ from the listing order 204. In cases of particular interest here, the execution order 226 is different than the listing order 204.

In some embodiments, a rule execution report 228 shows an execution history 230 of the set of rules, based on an automatically generated log 232. The history 230 includes at least some of the rules 126 (listed in the listing order) and at least some of the partial condition evaluation results 222.

In some embodiments, the execution events 216 include at least a specified number (e.g., one, two, three, four, five, or six) of the following: rule-execution-started, rule-execution-finished, rule-condition-evaluation-started, rule-condition-evaluation-finished, rule-condition-satisfied, rule-condition-not-satisfied, action-execution-started, action-execution-finished, result-update-triggered.

In some embodiments, the rule execution store 224 maintains a data structure 234 which maps an execution instance 256 of a given rule to at least the input values that were matched to the one or more partial conditions of the rule during that execution instance. For instance, the data structure 234 may include a structure which has a rule identifier field (e.g., index into array of rule names), execution instance (positive integer), and list or array of pointers to substructures that each have a copy of the input values and a pointer to a Rete nodes for the partial condition those input values were matched against.

Although the original Rete algorithm is still widely used, the production rule engine 122 may also or in addition use other performance optimization algorithms. In a particular system 102, the rule engine may thus execute rules in an execution order 226 that is consistent with at least one of the following: a Rete execution order, a Rete-II execution order, a Rete-III execution order, a Rete-NT execution order, a Rete* execution order, a RetePlus execution order.

Figure 7:
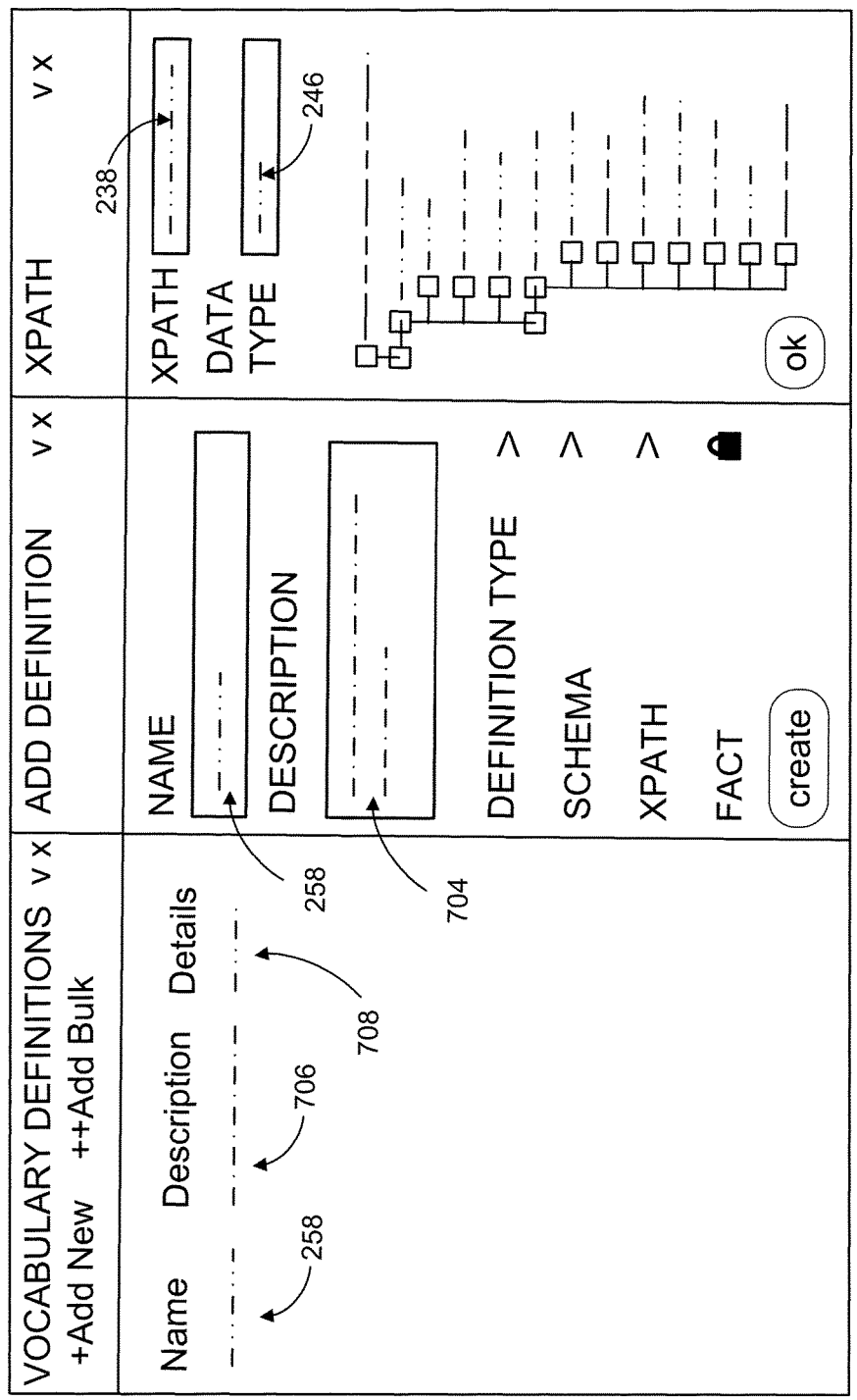
FIG. 7 is a line drawing illustrating part of a production rule system graphical user interface during technical behavior that creates an XML definition.

In some embodiments, a system 102 includes a graphical user interface 236 which upon execution obtains a user selection of an xpath 238 which is part of a rule in the set of rules 126. For example, FIG. 7 illustrates part of a GUI which supports user entry of an xpath when adding a definition 240 of an item 242 in a vocabulary 244 that can be used in rule partial conditions 206 and/or rule actions 208. As illustrated, the vocabulary item has a name 258, an optional description, and a data type 246. Depending on the embodiment, a vocabulary item definition may refer include the item name 258 and data type 246 alone, or it may more broadly include the name 258, associated data type 246, description (if any) 706, and details 708 such as xpath location (if any) 238, user name of the author 104 who added the definition, creation/modification timestamp, and so on.

In FIGS. 7 through 11, text in a GUI is shown either as alphanumeric text or as dashed and/or dotted lines. The dashed and/or dotted lines are used in response to patent document font size regulations and also to help further indicate the breadth of teachings herein. It does not follow, however, that GUIs as taught herein are limited to the particular alphanumeric text, screen layout, relative font size, capitalization, or other implementation details shown or suggested in the drawings or specification text; they are not thus limited. Rather, they cover the full functionality understood by one of skill in the art from the description provided.

Figure 8:
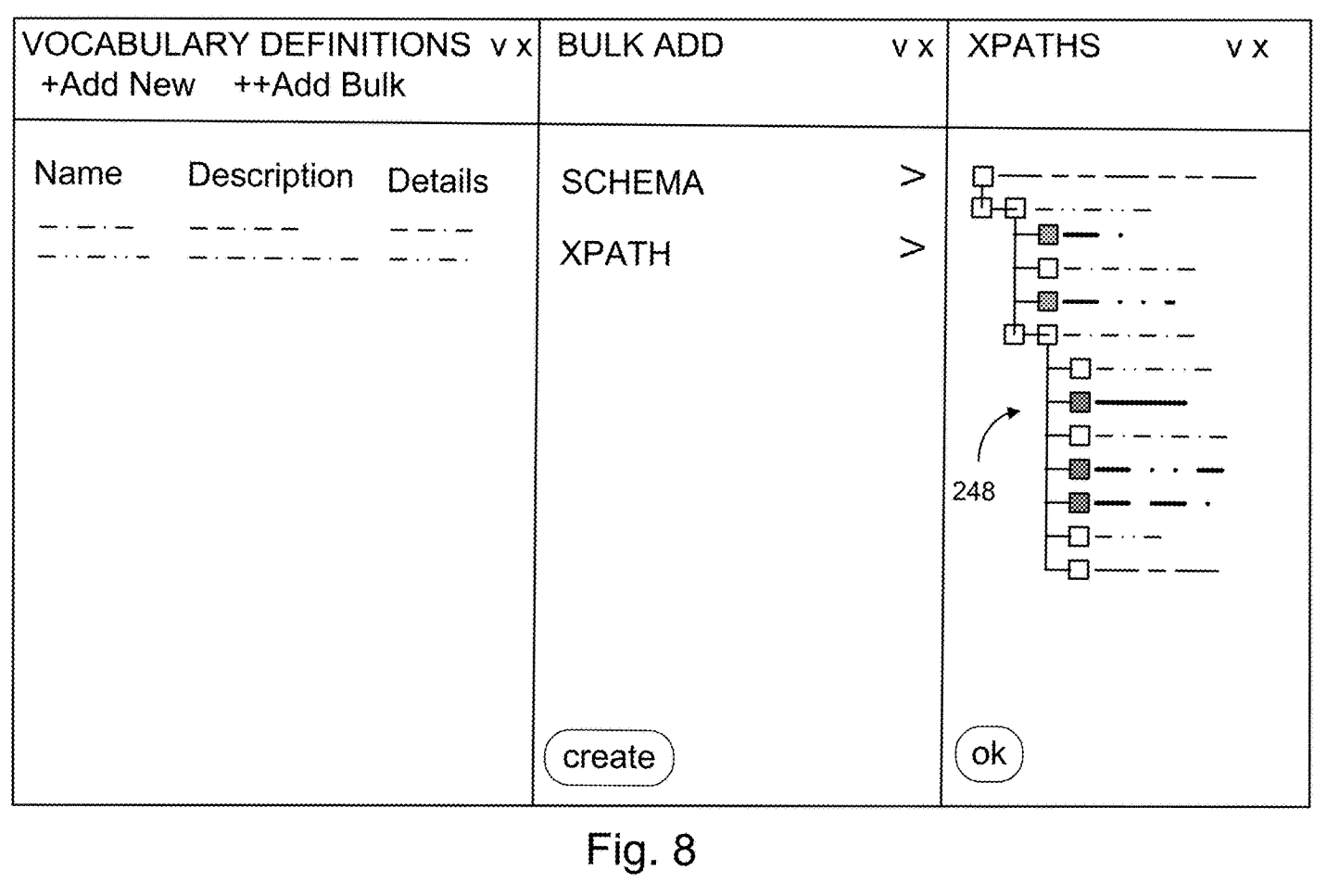

In some embodiments, a system 102 includes a graphical user interface 236 which upon execution obtains a user selection of XML schema nodes 128 to define a plurality of vocabulary items 242. Then one or more of the vocabulary items can be used in one or more rules in the set of rules, in partial conditions 206 and/or rule actions 208. For example, FIG. 8 illustrates part of a GUI which supports this in the form of a "bulk add". The rightmost column of the illustrated GUI, titled "XPATHS", shows a tree representation 248 of part of a schema 130, in which individual rows represent nodes 128. In the FIG. 8 example, five nodes have been selected by a user, as indicated by the filled-in boxes and the bolded text substitutes (namely, the dashed and/or dotted lines). More generally, some embodiments provide a tree-based view of an XML schema while providing UI ability for the user to select multiple nodes in the schema through keyboard multi-select and checkboxes. This will generate vocabulary items for each selection, while avoiding name clashes by making the selected node name unique. This can be done in an ECMAscript® language in a browser, for example (mark of Ecma International). Some examples provide support for optional nodes in an XML, by logic recognizing them as optional, thus preventing crashes and allowing the rule to execute.

Figure 4:
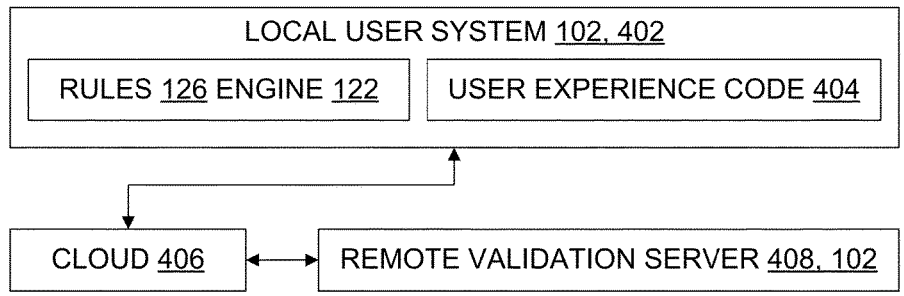
FIG. 4 is a diagram illustrating communication paths between a local user system and a remote validation server in some architectures.

In some embodiments, as illustrated for example in FIGS. 1, 2, and 4, a user system 102, 402 includes software 404 which upon receiving a text input 218 sends the received text through part of a cloud 406 to a remote server 408, 102 for a validation which checks validity of the received text based at least in part on at least a portion of a user-designated vocabulary 244 having associated data types 246. The software 404 obtains a validation result 250 from the remote server 408, thereby validating the input in the context of the data types. Two systems are "remote" from one another when they are located at separate IP addresses or separate LAN addresses in one or more networks 108.

In some embodiments, at least one of the rules 126 includes an SQL query 252, in the trigger condition (i.e., the partial conditions of the rule as a whole) and/or in the action portion. For example, an action 208 might say something like:
Print LondonPeople equals SELECT EmployeeID, FirstName, LastName, HireDate, City FROM Employees WHERE City='London'

In some embodiments, at least one of the rules 126 includes a condition (which may be a solitary partial condition 206 or a Boolean combination of partial conditions), a condition-satisfied action 208 which will be executed by the rule engine when the condition is satisfied, and a condition-not-satisfied action (a.k.a. and else portion 212) which will be executed by the rule engine when the condition is not satisfied.

Figure 9:
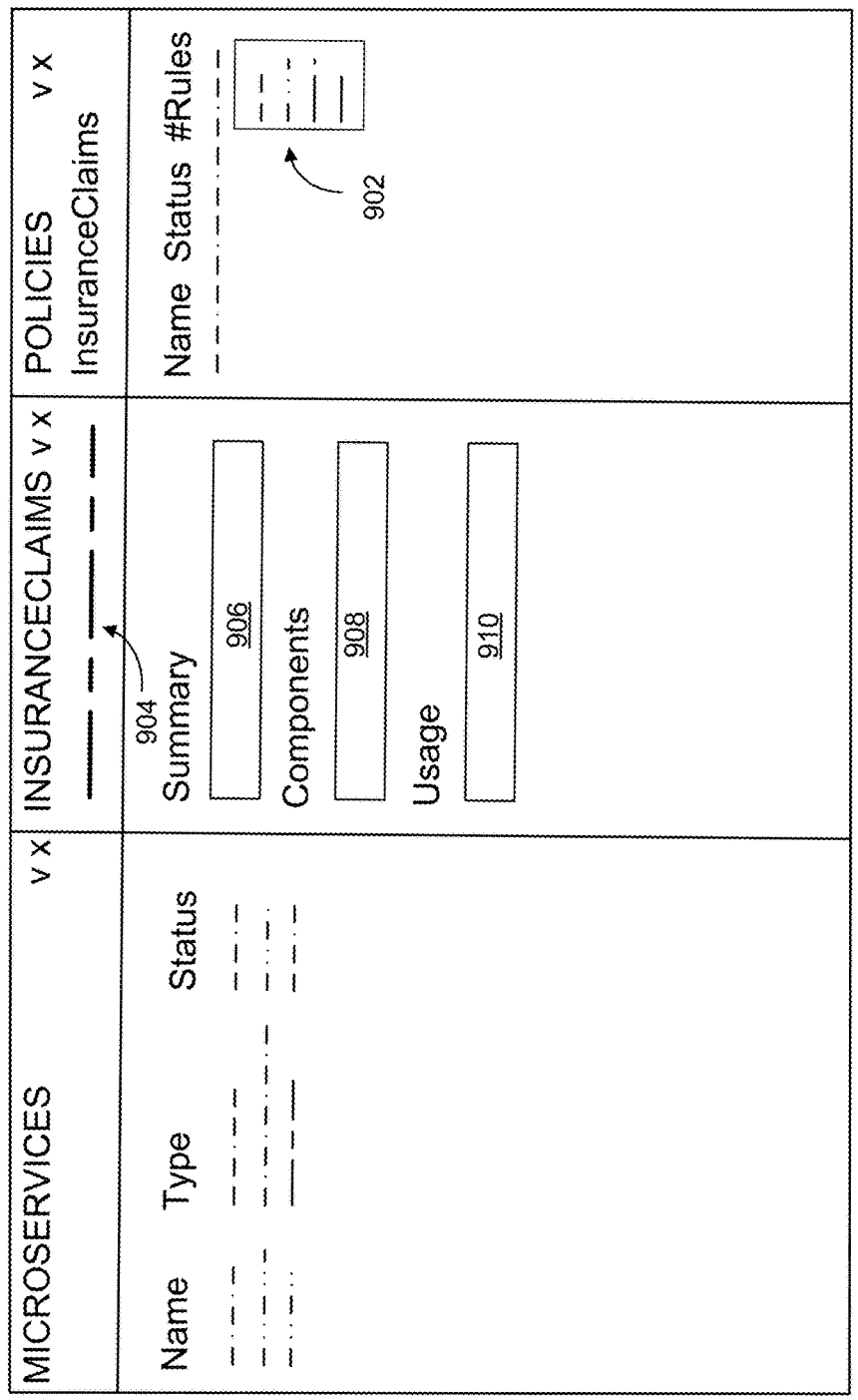
FIG. 9 is a line drawing illustrating part of a production rule system graphical user interface during technical behavior that marks a set of rules (e.g., rules of a "policy") as active or inactive.

In some embodiments, the set of rules (sometimes called a policy 202) is one of a plurality of sets of rules which includes at least one set marked by a user 104 as active, and at least one other set of rules marked by the user as inactive. Active rules will be considered by the rule engine 122 during execution, whereas inactive rules will be ignored. FIG. 9 illustrates one GUI mechanism for toggling policies 202 between active and inactive status, or for toggling individual rules within a policy. A drop-down menu 902 provides options such as Delete, MakeActive, MakeInactive, and TestPolicy. Depending on whether the policy in question is currently active or inactive, the MakeActive or MakeInactive option, respectively, is grayed out.

Figure 10:
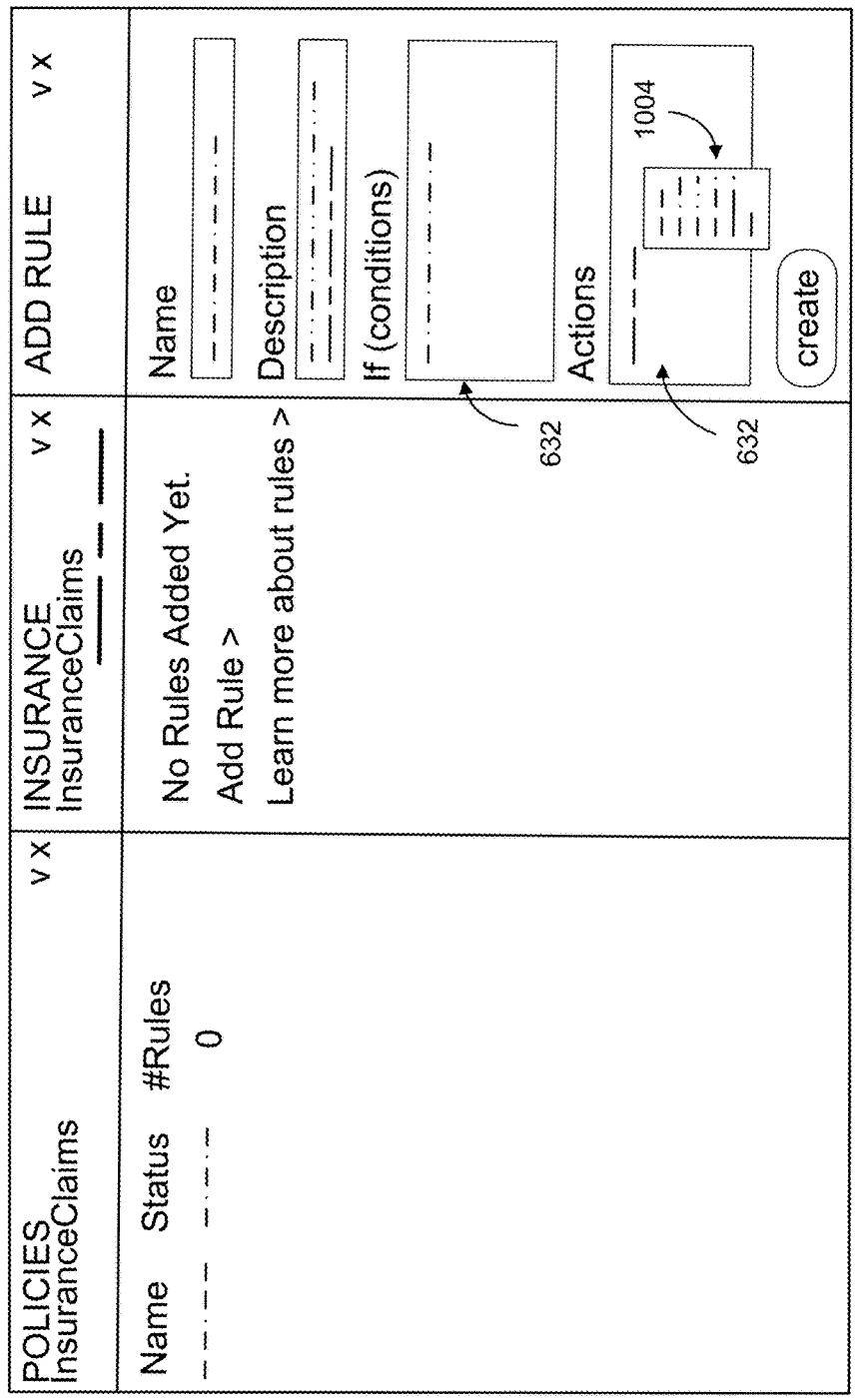
FIG. 10 is a line drawing illustrating part of a production rule system graphical user interface during technical behavior that adds a production (also called a "rule" herein)

In some embodiments, a system 102 includes software 404 which upon receiving text in a text input box of a graphical user interface 236 distinguishes between single values, sets of values, and value ranges. The FIG. 10 illustrates two such text input boxes 632, one for conditions 206 and one for actions 208. This and other GUI examples herein should be understood broadly to include not only I/O code but also processing code tailored to the functionality described for the GUI. For instance, by lexical analysis, parsing, and/or other mechanisms, a GUI 236 embodiment may distinguish between the following three texts:
EmployeeID (which represents a single value)
"Bobby Jones", "Patty Berg", and "Taylor Nguyen" (which represents a set) 90 to 99 (which represents a range)

In some embodiments, a system 102 includes software 404 which upon determining that text entered so far is the beginning of a vocabulary item, or a misspelling of a vocabulary item, will perform auto-completion and/or auto-correction. For example, auto-completion code 254 may use functionality adapted from Intellisense® software or other auto-completion software to use vocabulary items as a source of recognized identifiers and to check text entered into a rule authoring GUI 236 (mark of Microsoft Corporation). The auto-completion and/or auto-correction candidates may be displayed in a list 1004 near the partially and/or incorrectly entered text.

In some embodiments, a system 102 includes software 404 which upon determining that an input device focus is hovering over a vocabulary item 242 displays a full definition 240 of the vocabulary item.

In some embodiments, a system 102 includes software 404 which imported 656 the set of rules 126 after the rules were authored 304 in a word processor application 120 and/or authored 304 in a spreadsheet application 120. To accomplish this, text can be read automatically from a word processor or spreadsheet file and fed automatically into the input boxes 632, for example, or into the internal routines that receive text entered manually into the input boxes 632.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Processes

FIG. 2 illustrates a life cycle 302 of production rules 126. Rules are authored 304, either by being written from scratch or by modifying previously existing rules. The authored rules 126 then travel two paths concurrently—one path for computational system execution and one path for giving users higher-level understanding and authoring control. The authored rules 126 guide operation of a rule engine 122 in a computational system, whose execution of the rules produces an execution log 232 that reflects use of the Rete algorithm and/or other optimizations 306 made to improve rule engine performance. When different rules share a partial condition, or otherwise reference the same variables, for instance, an optimization 306 may execute the rules in a different order 226 than the order they were listed in by their author(s) 104. The authored rules 126 have an order 204 that is directly viewed by (and typically controlled directly by) the author(s) 104 of the rules. Accordingly, the listing order 204 typically reflects the author's understanding 308 of the rules 126. Rules which the author considers related in meaning or effect will tend to be grouped together. Rules may also be ordered in the GUI listing according to the author's own model of their execution sequence, their importance, or both.

The execution order and the listing order often differ from one another. They arise from different origins: engine 122 structure such as a Rete graph 132 vs. user 104. They are shaped by different goals: computational performance vs. ease of understanding, correctness, and easy modifiability.

However, examples herein correlate optimized execution order with production listing order. A resulting report 228 can be derived 310 from the execution log and the listing order, showing aspects of each. After the report is considered 312 by a user, additions, deletions, and/or other changes may be made to the rules by the author(s) 104. Then the modified rules are executed and listed, and the cycle continues. Those of skill will understand that FIG. 3 only shows one possible life cycle for production rules. Other life cycles 302 may include, e.g., changing the inputs given to the rules (with or without changing the rules themselves), validating inputs, and/or other steps.

Figure 5:
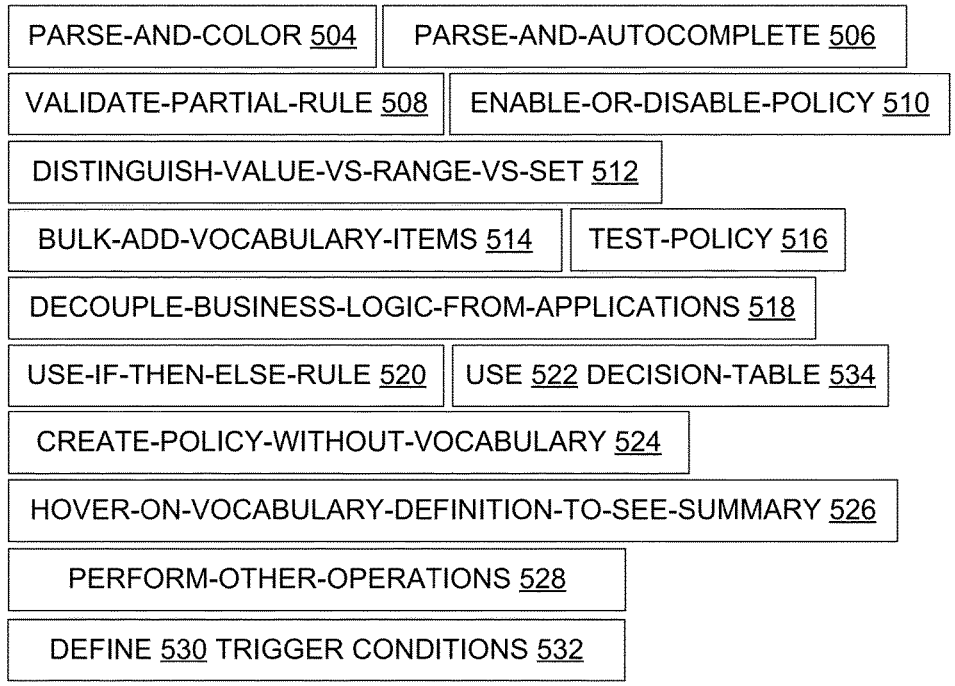
FIG. 5 is a block diagram illustrating particular user experience technical behaviors in some architectures.

Another way to understand processes performed in some embodiments is to consider the user's experience. FIG. 5 illustrates some examples of operations 502 which may be performed 660 by a system and experienced by a user, e.g., through GUIs 236 like those shown in FIGS. 7 through 11 and during processes like those illustrated in FIG. 6. The FIG. 5 examples include the following.

Parse-and-color 504: Parse a rule or portion of a rule and then color on screen one or more apparent errors (e.g., misspellings, syntax errors) to highlight the error(s) to a user 104. Some embodiments provide auto-completion and/or error coloring on a portal. In particular, some dynamically retrieve user defined vocabulary items in addition to predefined keywords and use regular expressions to parse and color the text and provide feedback of the kind previously supplied in non-cloud contexts by Intellisense® software (mark of Microsoft Corporation). Such software may show a list of all available keywords as well as vocabularies created by the user, and the list(s) may be populated dynamically.

Parse-and-autocomplete 506: Parse a rule or portion of a rule, identify a partially entered name (e.g., "Cl" in a FIG. 10 example discussed herein), obtain a user selection from a list of matching suggestions, and complete the name automatically without requiring the user to finish typing the characters of the name.

Validate-partial-rule 508: Send part of a rule 126, e.g., a partial condition 206 or an action 208, to a remote server 408 to be validated against a vocabulary 244, and receive results 250. Some embodiments validate input from a user in the context of the chosen data type to detect or prevent mistakes by the user early in the authoring of a rule, thereby increasing troubleshooting efficiency. Instead of a full-fledged parsing and interpreting of the rules on a save, some embodiments detect when the rules text boxes (conditions and actions) move out of focus, and then send 634 text box content across the data connection to a validation service. The service then uses stored vocabulary data types and interpreted parentheses and implicit data types (e.g., integer 1 vs. float 1.0) and evaluates the input expression as valid or not, and returns the result in a response. This validation result is then used to give the user a visual indicator of an error and error details found while interpreting the expression. This can be done with very low network and processing latencies in order to provide real-time feedback to the user 104.

Enable-or-disable policy 510: Set a policy 202 active or inactive, e.g., per a FIG. 9 example discussed herein.

Distinguish-value-vs-range-vs-set 512: Using lexical analysis, distinguish single values from sets and ranges in text a user enters in a text box 632.

Bulk-add-vocabulary-items 514: Add several vocabulary items concurrently, using, e.g., a node selection interface like that illustrated in FIG. 8.

Test-policy 516: Test a policy (set of rules 126) locally using, e.g., an interface like that illustrated in FIG. 11. Some embodiments allow users to test their policy stand-alone in the portal. Vocabularies are auto-detected and the user can enter values for them and test their policy. Execution of the stored policy at runtime happens with XML as input, with the vocabularies already dereferenced while storing. For test policy, execution may be simulated to be in terms of the vocabularies themselves. Users may enter input vocabularies (used in the policy), the XML may be internally created, the policy may be executed, and the vocabulary values may be extracted from the output XML and shown back to the user to simulate execution happening directly in terms of vocabularies. In some cases, conversion between a flat vocabulary structure and a tree XML structure may be done using the XML schema definition, the vocabulary inputs and the test policy experience. In some examples, all of the test policy views and execution logic are exposed as a service instead of being done in-process on an on-premises machine. Vocabulary values may be sent from portal to service and evaluation may happen on the service side with the response containing data used in viewing the execution result.

Decouple-business-logic-from-applications 518: Provide a production rule system interface, e.g., one consistent with one or more of FIGS. 7 through 11, which obtains business logic in the form of production rules. The applications 120 are invoked by actions 208, rather than directly.

Use-if-then-else-rule 520: Use a rule 126 which has at least one partial condition with an associated action 208 to be performed when that partial condition is met and also has at least one other action to be performed when that partial condition is not met.

Use-decision-table 522: Decision tables 534 may be viewed in the present context as an alternative format for rules 126. Like the if-then or if-then-else formats, decision tables associate partial conditions 206 with actions 208. A decision table 534 typically has four quadrants:

Conditions Condition alternatives
Actions Action entries

Each decision guided by a given table corresponds to a variable, relation or predicate whose possible values are listed among the condition alternatives. Some decision tables use Boolean values to represent the alternatives, some use numbered alternatives, and some use fuzzy logic or probability values. Each action is a procedure or operation which may be performed. The table entries specify whether (or in what order) the action(s) are to be performed for the group of condition alternatives the entry represents.

Create-policy-without-vocabulary 524: Although many examples herein use a vocabulary 244, those of skill will also recognize that rules 126 may be authored without presenting vocabulary editing options to users, e.g., by using a developer-defined and unchanging (from a business analyst perspective) set of variables in the working memory.

Hover-on-vocabulary-definition-to-see-summary 526: Hover a cursor in a GUI over a vocabulary item name, and more information is displayed, such as the xpath or other origin of the item, the data type of the item, and/or a list of rules the item is used in.

Perform-other-operations 528: Perform any one or more of the other operations identified herein.

Define 530 trigger condition 532: Define, e.g., enter into a box 632, the one or more partial conditions 206 and Boolean operator(s) connecting them, which collectively form a rule's trigger condition.

FIG. 7 shows aspects of a GUI during creation of an XML-based vocabulary definition. Although not expressly shown, the vocabulary's name could be displayed, e.g., under the VOCABULARY DEFINITIONS title. The vocabulary item's name 258 and description are entered as text. An xpath 238 is entered in this example (e.g., Patient/Claim/ClaimAmount), and the data type (e.g., integer, string, record, float, date, and so on) is taken or inferred from the node at the xpath-specified location. The DEFINITION TYPE may be, e.g., XML Element. The SCHEMA may be, e.g., an Insurance Claims schema 130. The FACT is locked, and a message such as "Select XPath first" may be displayed.

FIG. 8 shows aspects of a GUI during a bulk add of vocabulary definitions. Previously added vocabulary definitions 240 are listed under VOCABULARY DEFINITIONS. The ++Add Bulk option (which may be shown by an icon or button in an actual GUI) has been chosen. The SCHEMA in this example is the Insurance Claims schema 130, and that may be indicated in an actual GUI although for clarity of illustration and deference to patent drawing requirements it is not expressly shown in this Figure. Likewise, a message such as "Configure required settings" may be displayed under XPATH in an actual GUI 236. Dashed and/or dotted lines are shown in the Figure to represent text. Thus, in practice, the schema tree 248 includes text, e.g., it might recite something like: InsuranceClaimSchema.xsd Patient
    Name
    Email
    PatientID Claim
    Claim Date
    ClaimID
    TreatmentID
    ClaimAmount
    ClaimStatus
    Claim Status Reason FIG. 9 shows aspects of a GUI during an operation to make a policy active in preparation for subsequent execution of the rule engine 122. The leftmost column shown lists microservices, but production rule authoring and management may also be implemented as full services, modules, tasks, plug-ins, web endpoints, and/or in other ways that will be apparent to those of skill in the art. In the example, the microservice names, types, and statuses could be, for instance, something like the following:

| InsuranceClaims | Rules | In Progress |
|---|---|---|
| OrderProcessing | Transform | In Progress |
| TravelEligibility | Rule | Running |

Version and location columns could also be present in some microservice list examples.

With continued attention to FIG. 9, one example recites "microservice" under INSURANCECLAIMS. One lists the following icons or buttons as commands 904: Add, Explore Files, Stop, Restart, Swap, Delete, Reset Publish, Hosting Plan. In one example, a Summary region 906 displays a graphic with a label "Api-Default-West-US" connected to "TheLogger1 Microservice" (which connects to "HRDept App hosting"), and also connected to "SocialStorage Storage account". Additional labels in this region 906 in this particular example include "Microservices 5 instances 1 more", "Settings", "Tags", and "Quickstart". A Components region 908 displays labels and counts "Vocabulary Definitions 11", "Policies 1", and "Schemes 0". A Usage region 910 currently displays no labels, in this example. Under POLICIES, a policy name "Insurance" has status "inactive" and number of rules 0. Option MakeInactive is greyed out in the drop-down menu 902.

In an instance of FIG. 10, one example recites "RejectedClaim" as the Name of the rule being added, and the If condition text box 632 includes text "flase" as a misspelling of "false". The Actions text box 632 includes text "Cl" and the suggestions 1004 offered include "ClaimAmount", "ClaimDate", "ClaimID", "ClaimStatus" and "ClaimStatusReason". This list is consistent with and created from FIG. 8's example nodes.

In an instance of FIG. 11, one example of policy testing displays icons/buttons 1102 labeled Add New, Make Active, and Test Policy, and also displays icons/buttons 1104 labeled Run Test, Download XML, and Import Input. Under INSURANCE the Name column contains rule 126 names in the listing order 204, and the Details contain the corresponding If and Then (conditions and action, respectively) texts of the rules listed. Vocabulary items used in the listed rules are listed alphabetically lines 1106, each with a name 258, data type 246, box for input 218 value (if any) to be used in this test of the policy 202, and space for its value 222 after evaluation (if any) during the test. Lines 1108 contain a similarly formatted list for the vocabulary items used in test Claim 1, which may be used instead of the alphabetic list 1106.

Figure 6:
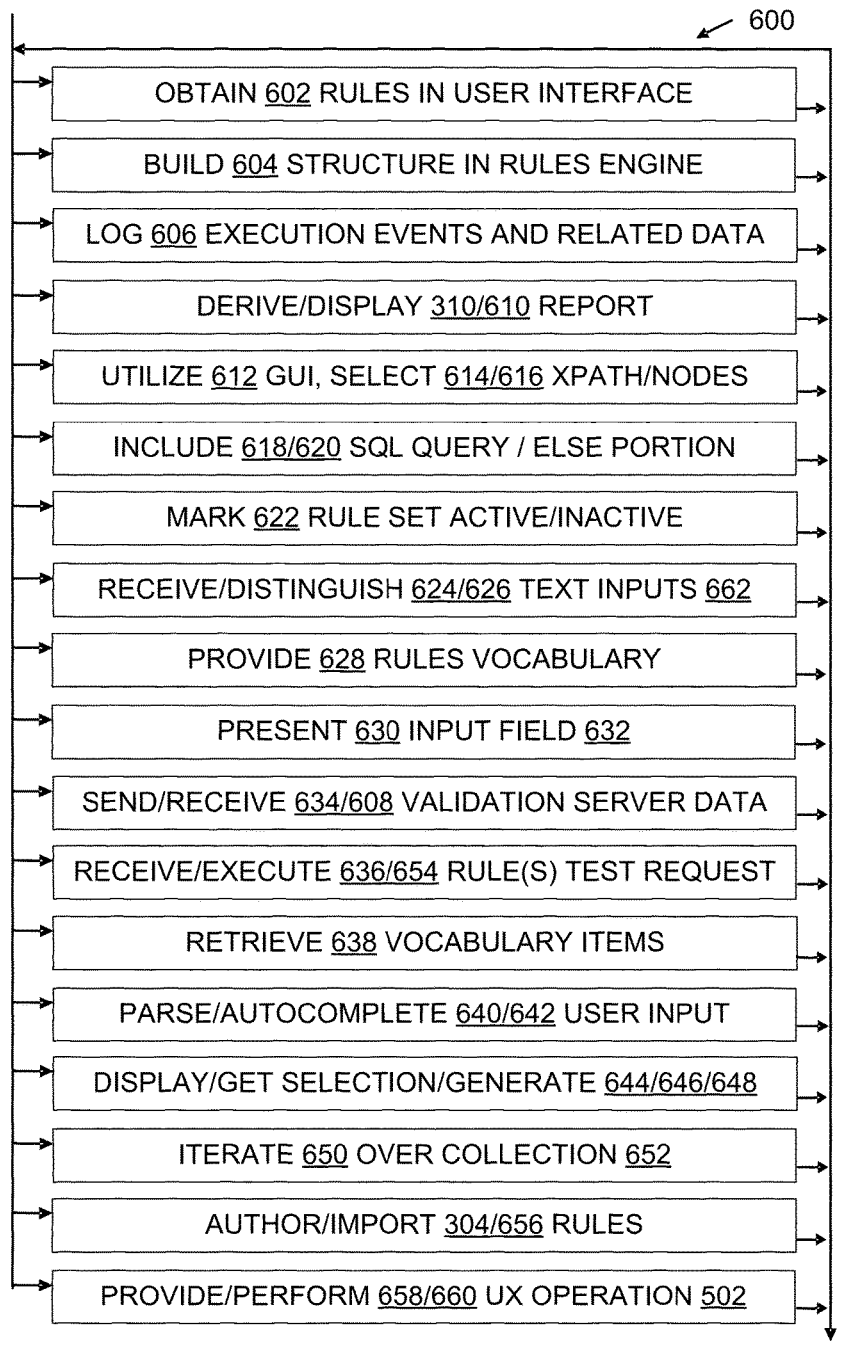
FIG. 6 is a flow chart illustrating aspects of some processes and configured storage media in some architectures.

FIG. 6 further illustrates some process embodiments in a flowchart 600. Technical processes shown in the Figures or otherwise disclosed may be performed in some embodiments automatically, e.g., by a GUI 236 under control of a quality control script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 6. Steps may be performed serially, in a partially overlapping manner, or fully in parallel. The order in which flowchart 600 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments provide or use a process for executing production rules in an optimized order 226 but reporting their execution in a user-defined listing order 204. One execution reporting process includes obtaining 602 a set of rules listed in a listing order, with each rule including at least one partial condition and at least one action. This may be accomplished, for example, by receiving rule text in a GUI 236.

Such a process may also include building 604 an execution structure which imposes an execution order 226 on the partial conditions, the execution order being different from the listing order. This may be accomplished, for example, by invoking or passing control to a production rule engine 122, such as an engine which implements the Rete algorithm to pattern match facts 218 (a.k.a. inputs) in working memory 220 against partial conditions 206 and submit actions 208 for execution when their respective partial conditions 206 evaluate as true or are otherwise satisfied.

Such a process may also include logging 606 in an execution log, during an execution of the rules according to the execution structure, at least the following: inputs 218 matched to partial conditions, results 222 of evaluating partial conditions according to matched inputs, and which rule 126 (e.g., as indicated by a rule identifier 210 or an index or pointer thereto) was executing when partial conditions were evaluated. This may be accomplished by software 404 tailored to perform these operations.

Such a process may also include deriving 310 an execution report 228 from the rule set and the execution log, with the execution report showing, in the listing order and for each of the rules, one or more of the following: whether the rule was executed, for each executed rule the one or more inputs 218 matched to the one or more partial conditions of the executed rule, and the results of evaluating the one or more partial conditions according to the one or more matched inputs. This may be accomplished, for example, by software 404 which implements a reordering algorithm (also referred to herein as a correlation algorithm). One such suitable reordering/correlation algorithm is illustrated by the following pseudo-code. A person of skill could also illustrate the reordering/correlation algorithm using a flow chart, a state machine, or other representation. In a given embodiment, the algorithm would be implemented with computing hardware and controlling software 404.

Reordering Correlation Algorithm
1. Assign each user-defined rule 126 an ID;
2. Identify individual partial conditions 206 used in the user-defined rules;
3. Build an optimized execution graph or other data structure 132 that imposes an optimized execution order on the individual partial conditions;
4. Execute the rules in the optimized execution order 226, and as you do that, make an internal log 232 of the inputs to the individual partial conditions, the evaluation results 222 of those individual partial conditions, which rule was firing when the individual partial conditions were evaluated, and the order in which the individual partial conditions are evaluated;
5. Walk through the user-defined list of rules in the user-defined order 204, and for each rule, look at the internal log and find out if that rule was fired—if it was not fired then make a reporting log entry saying it was not fired and move on to the next rule in the user-defined list—if the rule was fired then make a reporting log entry saying it was fired and giving the respective inputs to the individual partial conditions and the evaluation results of those individual partial conditions from the internal log for each time that rule was fired, then move on to the next user-defined rule;
6. After you've walked through the entire list of user-defined rules to build the reporting log, display 610 the reporting log.

More generally, some embodiments provide rule execution logs which make it easier for users to interpret rule execution than a conventional log. All rules in a policy are aggregated and executed using, e.g., the Rete algorithm in an optimized manner and not in serial order of Rule1, Rule2 and so on. However, the user has authored the rules envisioning them as running in serial order, and that's how it shows in the UI. (Both orders produce the same results in terms of working memory and which rules are triggered). During the Rete network execution, code separately stores metadata which is later deconstructed to simulate rule execution in serial order and the resulting log is shown to the user. That is, some embodiments translate Rete execution logs to serial rule execution logs that can easily be understood by the non-developer user.

In some embodiments, a process includes utilizing 612 input from a graphical user interface 236 to obtain a user selection 614 of an xpath 238 which is part of a rule in the set of rules. FIG. 7 illustrates an example.

In some cases, the process also includes obtaining a user selection 616 of schema nodes 128 that are located using the xpath. That is, the obtaining step includes utilizing 612 input from a graphical user interface 236 to obtain a user selection 616 of XML schema nodes 128 which will define vocabulary items 242 used in one or more rules in the set of rules. This is sometimes referred to herein as a "bulk add". FIG. 8 illustrates an example.

In some embodiments, a process includes obtaining 602 a rule 126 which includes 618 an SQL query. An example using SELECT, FROM, and WHERE is given elsewhere herein, and one of skill will appreciate that SQL parsing and database access routines from conventional software may be adapted for use in production rules 126 now that the possibility of such adaptation has been recognized.

In some embodiments, a process includes obtaining 602 a rule which includes 620 an ELSE portion 212. Such a rule includes a condition 206, a condition-satisfied action 208 which will be executed when the condition is satisfied, and a condition-not-satisfied action (an ELSE action 208) which will be executed when the condition is not satisfied.

In some embodiments, one can make policies inactive so they are not deleted but also not executed by the rule engine 122. For example, when a set 202 of rules is one of a plurality of sets of rules (i.e., a plurality of policies 202), one process includes utilizing 612 input from a graphical user interface 236 to mark 622 the set of rules as active. FIG. 9 illustrates an example GUI mechanism in the form of a drop-down menu with MakeActive and MakeInactive options. In general, at least one other set of rules is marked inactive, but the active/inactive toggle could only be used when only a single policy is present in the GUI.

Some embodiments can accept single values, sets of values, and value ranges in same box, e.g., in one of the text boxes 632. In one process, obtaining 602 a rule 126 includes receiving 624, from a single text input box of a graphical user interface, text 662 which potentially represents multiple kinds of inputs, namely, single values, sets of values, and value ranges. This process also includes distinguishing 626 between these kinds of inputs at least in part by lexical analysis of received text. In some cases, support is provided for single value, range, and set of values with a single input for vocabularies. This may be accomplished, for example, using a custom style of providing inputs for the user. In a single textbox, the user can provide individual values, sets, and/or ranges which are analyzed by the service and stored appropriately. One approach uses a lexical marker "to" for ranges, uses commas as delimiters, uses quotes to identify start and end of values, and uses \ for escaping. Of course, other lexical markers, delimiters, identifiers, and/or escape indicators may be used in a given embodiment.

Configured Media

Figure 3:
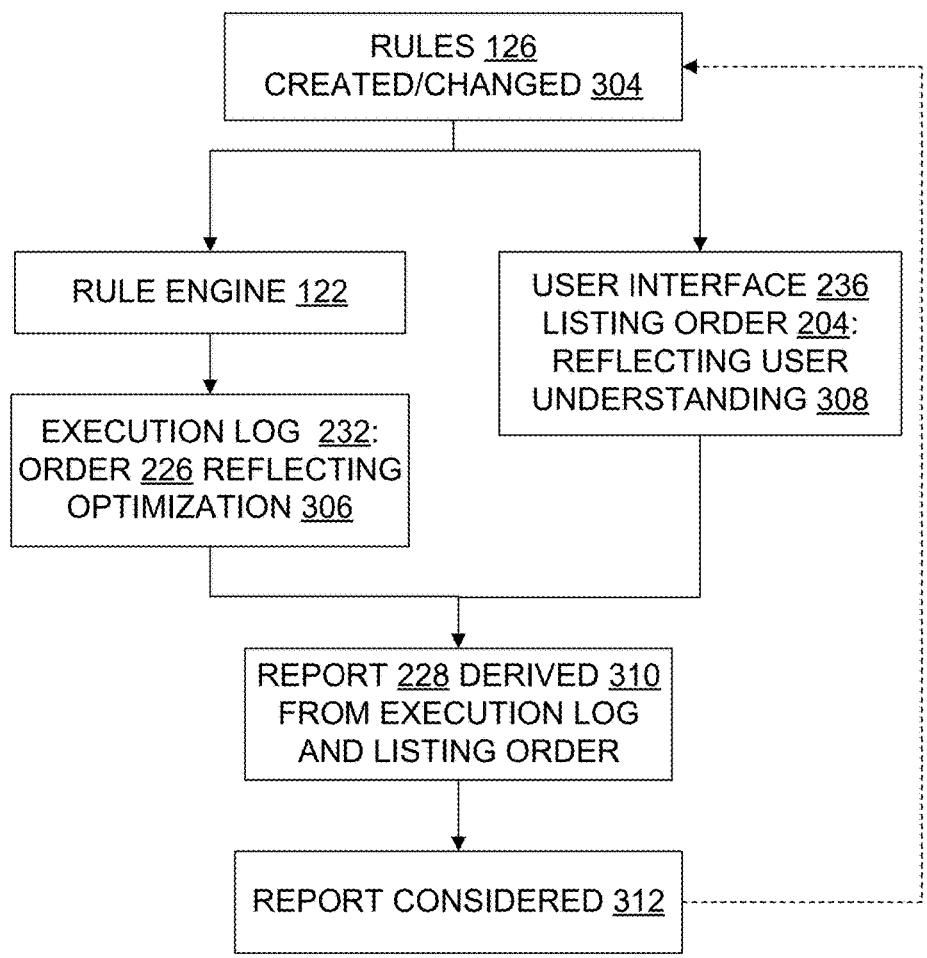
FIG. 3 is a diagram illustrating a life cycle of production rules in some architectures.

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as software 404, correlated report 228, multi-value-distinguishing boxes 632 with attendant lexical analysis code, and other artifacts, in the form of data 118 and instructions 116, read from a removable medium 114 and/or another source such as a network connection, to form a configured medium. The configured medium 112 is capable of causing a computer system to perform technical process steps for correlating optimized execution order 226 with production listing order 204 and providing 658 user experience operations 502 as disclosed herein. FIGS. 3, 4, and 6, for instance thus help illustrate configured storage media embodiments and process embodiments, as well as system and process embodiments. In particular, any of the process steps illustrated in FIG. 3 and/or FIG. 6, or otherwise taught herein, may be used to help configure a storage medium to form a configured medium embodiment.

Some embodiments use or provide a computer-readable storage medium 112, configured with software which upon execution by at least one processor 110 in a cloud computing environment performs a process for rule authoring 304 and execution from a portal of the cloud computing environment. This process may include providing 628 a rules vocabulary 244 in a graphical user interface of the portal on a display of a local computing system, namely, a set of natural-language names which correspond to software artifacts having data types.

This process may include presenting 630 a rule condition 206 input field 632, e.g., a multi-value-distinguishing text box 632 or other input or selection GUI mechanism. The rule condition input field may be dedicated to receiving text which describes a trigger condition 552 for a rule. Similarly, this process may include presenting a rule action 208 input field in the graphical user interface, with the rule action input field dedicated to receiving text which describes an action to be taken when the trigger condition is satisfied.

This process may include obtaining 602 through the graphical user interface a set of rules listed in a listing order, with each rule trigger condition including at least one partial condition. In some cases, the rules include at least two of the natural-language names 258.

This process may include logging 606 in an execution log, during an execution of the rules according to an execution order on the partial conditions that is different from the listing order, at least the following: inputs matched to partial conditions, results of evaluating partial conditions according to matched inputs, and which rule was executing when partial conditions were evaluated.

This process may include deriving 310 an execution report 228 from the rule set and the execution log. The execution report may show, in the listing order and for each of the rules, whether the rule was executed. The report may also show for each executed rule the one or more inputs matched to the one or more partial conditions of the executed rule, and may also show the results of evaluating the one or more partial conditions according to the one or more matched inputs.

In some examples, the execution order 226 is a Rete execution order on the partial conditions. In some, other execution orders are used, e.g., orders 226 which are imposed by improvements on the original Rete algorithm.

Some examples include remote validation of input, e.g., remote validation of proposed rules 126. Upon receiving a text in either input field 632, one process sends 634 the received text to a remote server 408 for a validation which checks validity of the received text based at least in part on at least a portion of the vocabulary 244. The process obtains 608 a validation result 250 from the remote server, thereby validating input in the context of the data types 246. Some examples of validation results 250 are:
  Definitions 240 found in the recognized vocabulary 244.
  Data types assigned to items in received text match data types 246 of items 242.
  No definition 240 for specified item was found in the recognized vocabulary 244.
  Data type assigned to specified item in text does not match data type 246 of item 242 in the recognized vocabulary 244.

In some examples, the process includes receiving 636 through the graphical user interface a request to test the set of rules, and then executing 654 at least one of the rules on the local computing system. FIG. 11 illustrates one of the many possible GUIs capable of accepting a request to test a set 202 of rules. Execution of the rules can be accomplished using a rule engine 122 and working memory 220 on the local system 102 after passing the rules and inputs to them from the GUI.

In some examples, the process includes dynamically retrieving 638 user-defined vocabulary item names 258, parsing 640 user input, and providing 642 auto-completion of identifier portions which appear in the parsed user input, based at least in part on the dynamically retrieved user-defined vocabulary item names. FIG. 10 shows one of the many suitable GUIs for such a parse-and-autocomplete operation 506.

In some examples, the process includes displaying 644 a tree 248 representation of an XML schema 130, getting 646 a user selection of multiple nodes 128 of the tree representation, and generating 648 a new vocabulary item for each of a plurality of the nodes of the user selection. This may be done, for example, using a GUI like that illustrated in FIGS. 7 and 8 for steps 644 and 646, and using code adapted from Microsoft BizTalk® software, or code with similar functionality, to perform step 648 (mark of Microsoft Corporation).

In some examples, the process includes receiving in one of the input fields a name of a collection 652 of objects, and then automatically iterating 650 over the collection of objects passed in. This allows a user 104 such as a business analyst to avoid writing logic in the input field which handles the objects individually.

ADDITIONAL EXAMPLES

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived in part from Azure™ Apps documentation, including a BizTalk® Rules part of Logic Apps (marks of Microsoft Corporation). Azure™ Apps and BizTalk® products and services use software implemented by Microsoft Corporation. Aspects of the Azure™ Apps and BizTalk® software and/or documentation are consistent with or otherwise illustrate aspects of the embodiments described herein. However, it will be understood that Azure™ Apps and BizTalk® documentation and/or implementation choices do not necessarily constrain the scope of such embodiments, and likewise that Azure™ Apps and BizTalk® solutions and/or their documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Some embodiments provide or support rule configuration in cloud environments. In particular, some aspects of some embodiments arose from challenges created when a Rete rule engine translates user rules into an optimized expression graph 132 and individual partial conditions are executed in a performance-optimal (not sequential or user defined) order.

In some embodiments, each rule 126 is authored by the user in a custom language and the rules are ordered 204 in the way the user wants them to be executed. As part of the rule execution, the service reduces each rule to a set of LINQ expressions using the vocabulary definitions and builds the Rete graph 132. (LINQ expressions are a way to evaluate the expressions; a given embodiment may use other mechanisms.) In each Rete node, along with the expression to be evaluated or executed, the corresponding rule name and rule content, as authored by the user, and the vocabulary definitions, are stored as metadata. As part of the Rete engine execution, when each node (expression) gets evaluated to true or false or when the action 208 gets executed, the corresponding rule metadata with the result gets output to a list 232. At the end of one iteration of evaluating and executing all the rules, the rule metadata gets sorted in order 204 of the authored rules and printed with the inputs 218 used for evaluation of conditions 206 and execution of actions. In this manner, the user 104 is given a view 228 of serial execution of the rules authored, while internally the rules were executed using Rete code.

Some embodiments include, implement or use a method which includes (a) receiving a first rule 126 and a second rule 126 in a policy 202, the first rule and second rule listed in a first order 204, (b) executing 654 the first rule and the second rule in a cloud environment 100, the first rule and the second rule executed in a second optimized rule order 226, the second optimized rule order 226 different than the first order 204, and (c) storing 606 a first result from the first rule and a second result from the second rule. The method may also include one or more of the following: (d) generating simulated results 222 based on the first result and the second result by simulating execution of the first rule and the second rule being executed in the first order, (e) transmitting the simulated results, (f) using a Rete algorithm to determine the second optimized rule order, and (g) providing the simulated results in a log file.

To further illustrate order correlation and other teachings herein, consider the following example, in which A, B, C, P, Q, and R designate vocabulary items 242 to be processed by a rule engine 122.

Rule 1: IF A==1 AND B==2 THEN P=10.
Rule 2: IF C==3 AND D==4 THEN Q=20.
Rule 3: IF B==2 AND C==3 THEN R=30.

In the above example for conditions, there are three trigger conditions (one per rule) but four independent partial conditions (one involving A, one involving B, one involving C, and one involving D) which results in four nodes in the Rete graph 132.

One may then expect a report 228 with content along the following lines, with the understanding that this may be considered a simplified example meant for illustration. Logs 232 and reports 228 in a commercial implementation may contain additional detailed information. A report 228 may contain verbatim portions of a log 232.

Rule 1 executed once.
Rule 2 executed once.
Rule 3 executed once.
Executed Rule 1:
Result: PASSED
Item/Vocabulary values Before execution: A=1, B=2, P=55.
Item/Vocabulary values After execution: A=1, B=2, P=10.
Executed Rule 2:
Result: PASSED
Item/Vocabulary values Before execution: C=3, D=4, Q=44.
Item/Vocabulary values After execution: C=3, D=4, Q=20.
Executed Rule 3:
Result: PASSED
Item/Vocabulary values Before execution: B=2, C=3, R=33.
Item/Vocabulary values After execution: B=2, C=3, R=30.

In the above example, as part of actual execution, due to the Rete optimizations, the two partial conditions in rule 3 will not get evaluated because as they were already evaluated as part of rule 1 and rule 2. An algorithm for extracting execution logs will back track the execution and determine which conditions are evaluated and extract their results and the individual items' respective values. These are shown 610 to the user as if they had been executed in the sequential/user-defined order 204 instead of using a Rete algorithm or other optimization.

Some complexity arises when one or more rules are executed multiple times, so execution instances 256 are tracked. Complexity may also arise when the actions 208 and conditions 206 work on the same items, e.g., an action updates A and then a next condition depends on the value of A. A rule can execute multiple times based on the number of input values that satisfy the rule's trigger condition and the way the rules are written. In some embodiments, a user can command an engine to rerun all the rules with the latest item values. However, a given embodiment will not necessarily recognize or process through such complexities.

In some examples, as part of the Rete engine execution, when each node (expression) gets evaluated to true or false or when the action gets executed, the corresponding Rule metadata with the result gets output to a list 232. Thus, the system keeps a log showing (i) the order in which rule conditions (or partial conditions) are met during actual execution of the re-ordered rules, (ii) which of the user-specified rules this condition or partial condition corresponds to, e.g., the rule's name or other ID, and (iii) the input values that satisfied this condition or partial condition. One of skill will note that Rete metadata could potentially be output to the list at any of the following times, depending on the implementation: (i) after the node gets evaluated as True but BEFORE the action gets executed, (ii) after the action gets executed, or (iii) in parallel as the action is being executed. One example algorithm collects the information during (i) (ii) and (iii) and builds a data structure to hold it. Once the execution is done, the code 404 emits/generates all the logs/metadata.

Note that in some cases Rete metadata can be output to the list when the node evaluates to False. The metadata explicitly indicates that the rules evaluated to False, along with providing the actual item values used for that evaluation. The sorted output metadata could be displayed on a screen, stored in a file, and/or transmitted by email, for example.

Some examples do more with the user-specified order beyond showing it to the user. For instance, some compare the user-specified order under the given facts with the user-specified order overall to help the user look for missing rules, duplications, etc. that might help the user tune or debug the rules. Some examples display the rules respective execution count (total instances 256) and the display order of rules metadata will help the user to find out the missing rules. Some display the individual items' values 218 that are used while evaluating the rule. As to execution count, one of skill will recognize that chaining is a way to tell the rule engine 122 to re-evaluate certain rules matching some input. Chaining is one reason for evaluating the same rule(s) multiple times.

As to metadata/log extraction, in one example each rule that gets executed has its own identifier 210, in this case the Rule name plus an Execution iteration id. If a rule executes multiple times, then a unique identifier is given to each execution instance 256.

In some embodiments, a rule engine execution tracker 214 is a component which tracks/reads the execution details of all partial conditions. The tracker 214 reads the execution events 216 such as 'Rule condition evaluation successful/failed', 'Actions evaluation stated, 'Actions evaluation ended', 'Update action triggered' etc. Additionally, this execution tracker 214 captures additional information with each event, such as independent item 242 values and execution results 222.

In some embodiments, a rule execution store 224 is a component which stores the execution/event details in a specific structured data format, so that details can be inserted, updated and retrieved appropriately and intelligently. The rule execution tracker 214 sends the information to this store 224. This rule execution store 224 has the logic for storing all the rules information and finally emits all the rules' execution information in the user defined order.

In one implementation, the following execution events 216 are captured by the tracker 214 and stored in the store 224.

Rule execution started. Here the code 404 starts a timer, initializes the store and reads/reviews a complete list of rules provided by the user.

Rule condition is evaluated. Stored with this event are the rule name, partial condition being evaluated, actual full condition provided by the user and independent items' values.

Rule condition successful. Stored along with the rule name.

Action execution started. Store rule name, action statement being evaluated, items' values.

Action execution ended. Store rule name, action statement being evaluated, items' values.

Update triggered. Update results to re-evaluate all the dependent rules/conditions.

Execution completed. Post processes the data captured in the store, e.g., finding the execution times, each rule's execution count and other formatting to aid readability. Prints/returns data in the specific order 204.

As to the specific structured data format used by the rule execution store, the following details may be helpful. This implementation of the store 224 internally maintains a dictionary to keep rules execution metadata. Each dictionary item maps to an execution of a specific rule. Each dictionary item internally maintains a stack and collections to store the rules information such as conditions, actions, results, priority, execution iteration id, and items' values before/after execution. The store exposes certain operations, such as add run, get recent run, move to next iteration, and consolidate rules execution information. The store internally maintains a unique identifier (iteration id and rule name) to find a rules execution instance. Iteration-id gets incremented every time the engine 122 hits an update call. An add run operation does act such as stamping each incoming rule with the current iteration, validating if the rule is a new one or already appeared in this iteration, and appropriately adding to the collection. A get recent run operation finds the execution info in the current iteration with the given rule name. A consolidate rules execution operation consolidates (i.e., reorders the dictionary information based on the iteration ids and the rule priorities given by the user) the information available in the dictionary and returns to the consumer.

In some examples, there is a grouping mechanism for vocabulary definitions. As noted, rules can get grouped into policies. By analogy, vocabulary definitions can get grouped into vocabularies. In some cases, there can be multiple vocabulary files each of which will contain multiple vocabulary definitions. As an example of using a vocabulary within a vocabulary, assume a user creates a vocabulary "EU Countries"="UK", "Germany"; and creates "Asian Countries"="India", "China". The user could create a third vocabulary "Countries Serviced Worldwide"="EU Countries", "Asian Countries". The list of countries serviced worldwide would update automatically as the other lists are updated.

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

An example #1 provides an execution reporting process which includes: obtaining 602 a set of rules 126 listed in a listing order 204, each rule including at least one partial condition 206 and at least one action 208; building 604 an execution structure 132 which imposes an execution order 226 on the partial conditions, the execution order being different from the listing order; logging 606 in an execution log 232, during an execution of the rules according to the execution structure, at least the following: inputs 218 matched to partial conditions, results 222 of evaluating partial conditions according to matched inputs, and which rule was executing when partial conditions were evaluated; and deriving 310 an execution report 228 from the rule set and the execution log, the execution report showing, in the listing order and for each of the rules, whether the rule was executed and also showing for each executed rule the one or more inputs matched to the one or more partial conditions of the executed rule and the results of evaluating the one or more partial conditions according to the one or more matched inputs.

An example #2 is the example #1 wherein the obtaining includes obtaining a rule which includes 620 a condition, a condition-satisfied action which will be executed when the condition is satisfied, and a condition-not-satisfied action 212 which will be executed when the condition is not satisfied.

An example #3 is the example #1 wherein the set of rules is one of a plurality of sets 202 of rules, the process further includes utilizing input from a graphical user interface to mark 622 the set of rules as active, and at least one other set of rules is marked inactive.

An example #4 is the example #1 wherein the obtaining includes receiving 624, from a single text input box 632 of a graphical user interface 236, text which represents multiple kinds of inputs 662, namely, single values, sets of values, and value ranges, and the process also includes distinguishing 626 between these kinds of inputs at least in part by lexical analysis of received text.

An example #5 provides a computer-readable storage medium 112, configured with software which upon execution by at least one processor in a cloud computing environment performs a process for rule authoring and execution from a portal of the cloud computing environment, the process including: providing 628 a rules vocabulary 244 in a graphical user interface 236 of the portal on a display of a local computing system 102, namely, a set of natural-language names 258 which correspond to software artifacts having data types 246; presenting 630 a rule condition 206 input field 632 in the graphical user interface, the rule condition input field dedicated to receiving text which describes a trigger condition 532 for a rule 126; presenting 630 a rule action 208 input field 632 in the graphical user interface, the rule action input field dedicated to receiving text which describes an action to be taken when the trigger condition is satisfied; obtaining 602 through the graphical user interface a set 202 of rules listed in a listing order 204, each rule trigger condition including at least one partial condition, the rules including at least two of the natural-language names; logging 606 in an execution log 232, during an execution of the rules according to an execution order 226 on the partial conditions that is different from the listing order, at least the following: inputs 218 matched to partial conditions, results 222 of evaluating partial conditions according to matched inputs, and which rule was executing when partial conditions were evaluated; and deriving 310 an execution report 228 from the rule set and the execution log, the execution report showing, in the listing order and for each of the rules, whether the rule was executed and also showing for each executed rule the one or more inputs matched to the one or more partial conditions of the executed rule and the results of evaluating the one or more partial conditions according to the one or more matched inputs.

An example #6 is example #5 wherein upon receiving a text 662 in either input field, the process sends 634 the received text to a remote server 408 for a validation which checks validity of the received text based at least in part on at least a portion of the vocabulary, and the process obtains 608 a validation result 250 from the remote server, thereby validating input in the context of the data types.

An example #7 is example #5 wherein the process further includes receiving 636 through the graphical user interface a request to test the set of rules, and then executing 654 at least one of the rules on the local computing system.

An example #8 is example #5 wherein the process further includes: dynamically retrieving 638 user-defined vocabulary item names; parsing 640 user input; and providing auto-completion 642 of identifier portions which appear in the parsed user input, based at least in part on the dynamically retrieved user-defined vocabulary item names.

An example #9 is example #5 wherein the process further includes displaying 644 a tree representation 248 of an XML schema 130, getting 646 a user selection of multiple nodes 128 of the tree representation, and generating 648 a new vocabulary item 242 for each of a plurality of the nodes of the user selection.

An example #10 is example #5 wherein the process further includes receiving in one of the input fields a name of a collection 652 of objects, and then automatically iterating 650 over the collection of objects passed, thereby allowing a user to avoid writing logic in the input field which handles the objects individually.

An example #11 provides a system 102 including: at least one processor 110; a memory 112 in operable communication with the processor; a set 202 of rules 126 listed in a listing order 204 in the memory, each rule including at least one partial condition 206 and at least one action 208, each rule having a respective identifier 210; a rule engine execution tracker 214 having software which upon execution by the processor tracks execution of partial conditions at least in part by reading execution events 216; a rule execution store 224 having software which upon execution by the processor stores rule identifiers with execution event data provided to the rule execution store by the rule engine execution tracker; a rule engine 122 which emits execution events while executing rules in an execution order 226 by matching inputs to partial conditions, evaluating partial conditions with matched inputs, and triggering execution of rule actions based on partial condition evaluation results, the execution order being different than the listing order; and a rule execution report 228 which shows an execution history of the set of rules, including at least some of the rules listed in the listing order and at least some of the partial condition evaluation results.

An example #12 is example #11 wherein the execution events 216 include at least three of the following: rule-execution-started, rule-execution-finished, rule-condition-evaluation-started, rule-condition-evaluation-finished, rule-condition-satisfied, rule-condition-not-satisfied, action-execution-started, action-execution-finished, result-update-triggered.

An example #13 is example #11 wherein the rule engine 122 executes rules in an execution order 226 that is consistent with at least one of the following: a Rete execution order, a Rete-II execution order, a Rete-III execution order, a Rete-NT execution order, a Rete* execution order, a RetePlus execution order.

An example #14 is example #11, wherein the system is further characterized in at least two of the following ways: the system includes a graphical user interface 236 which upon execution obtains a user selection 614 of an xpath 238 which is part of a rule in the set of rules; the system includes a graphical user interface which upon execution obtains a user selection 616 of XML schema nodes 128 to define a plurality of vocabulary items 242, at least one of which vocabulary items is used in one or more rules in the set of rules; the system includes software which upon receiving a text input sends 634 the received text to a remote server 408 for a validation which checks validity of the received text based at least in part on at least a portion of a user-designated vocabulary having associated data types 246, and the software obtains a validation result 250 from the remote server, thereby validating input in the context of the data types; at least one of the rules includes 618 an SQL query; or at least one of the rules includes 620 a condition, a condition-satisfied action which will be executed by the rule engine when the condition is satisfied, and a condition-not-satisfied action which will be executed by the rule engine when the condition is not satisfied.

An example #15 is example #11, wherein the system is further characterized in at least two of the following ways: the set of rules is one of a plurality of sets of rules which includes at least one set marked 622 by a user as active, and at least one other set of rules marked by the user as inactive; the set of rules includes at least one rule marked 622 by a user as active, and at least one other rule marked by the user as inactive; the system includes software which upon receiving text in a text input box of a graphical user interface distinguishes 626 between single values, sets of values, and value ranges; the system includes software which upon determining that an input device focus is hovering 660 over a vocabulary item displays a definition of the vocabulary item; the system includes software which imported 656 the set of rules after the rules were authored in a word processor application; or the system includes software which imported 656 the set of rules after the rules were authored in a spreadsheet application.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 6 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An execution reporting process, comprising:
   obtaining a set of rules listed in a listing order, each rule including at least one partial condition and at least one action;
   building an execution structure which imposes an execution order on the partial conditions, the execution order being different from the listing order;
   logging in an execution log, during an execution of the rules according to the execution structure, at least the following: inputs matched to partial conditions, results of evaluating partial conditions according to matched inputs, and which rule was executing when partial conditions were evaluated; and
   deriving an execution report from the rule set and the execution log, the execution report showing, in the listing order and for each of the rules, whether the rule was executed and also showing for each executed rule the one or more inputs matched to the one or more partial conditions of the executed rule and the results of evaluating the one or more partial conditions according to the one or more matched inputs.

2. The process of claim 1, wherein the obtaining comprises utilizing input from a graphical user interface to obtain a user selection of an xpath which is part of a rule in the set of rules.

3. The process of claim 1, wherein the obtaining comprises obtaining a rule which includes an SQL query.

4. The process of claim 1, wherein the obtaining comprises obtaining a rule which includes a condition, a condition-satisfied action which will be executed when the condition is satisfied, and a condition-not-satisfied action which will be executed when the condition is not satisfied.

5. The process of claim 1, wherein the obtaining comprises utilizing input from a graphical user interface to obtain a user selection of XML schema nodes which will define vocabulary items used in one or more rules in the set of rules.

6. The process of claim 1, wherein the set of rules is one of a plurality of sets of rules, the process further comprises utilizing input from a graphical user interface to mark the set of rules as active, and at least one other set of rules is marked inactive.

7. The process of claim 1, wherein the obtaining comprises receiving, from a single text input box of a graphical user interface, text which represents multiple kinds of inputs, namely, single values, sets of values, and value ranges, and the process also comprises distinguishing between these kinds of inputs at least in part by lexical analysis of received text.

8. A computer-readable storage medium, configured with software which upon execution by at least one processor in a cloud computing environment performs a process for rule authoring and execution from a portal of the cloud computing environment, the process comprising:
 providing a rules vocabulary in a graphical user interface of the portal on a display of a local computing system, namely, a set of natural-language names which correspond to software artifacts having data types;
 presenting a rule condition input field in the graphical user interface, the rule condition input field dedicated to receiving text which describes a trigger condition for a rule;
 presenting a rule action input field in the graphical user interface, the rule action input field dedicated to receiving text which describes an action to be taken when the trigger condition is satisfied;
 obtaining through the graphical user interface a set of rules listed in a listing order, each rule trigger condition including at least one partial condition, the rules including at least two of the natural-language names;
 logging in an execution log, during an execution of the rules according to an execution order on the partial conditions that is different from the listing order, at least the following: inputs matched to partial conditions, results of evaluating partial conditions according to matched inputs, and which rule was executing when partial conditions were evaluated; and
 deriving an execution report from the rule set and the execution log, the execution report showing, in the listing order and for each of the rules, whether the rule was executed and also showing for each executed rule the one or more inputs matched to the one or more partial conditions of the executed rule and the results of evaluating the one or more partial conditions according to the one or more matched inputs.

9. The computer-readable storage medium of claim 8, wherein the execution order is a Rete execution order on the partial conditions.

10. The computer-readable storage medium of claim 8, wherein upon receiving a text in either input field, the process sends the received text to a remote server for a validation which checks validity of the received text based at least in part on at least a portion of the vocabulary, and the process obtains a validation result from the remote server, thereby validating input in the context of the data types.

11. The computer-readable storage medium of claim 8, wherein the process further comprises receiving through the graphical user interface a request to test the set of rules, and then executing at least one of the rules on the local computing system.

12. The computer-readable storage medium of claim 8, wherein the process further comprises:
 dynamically retrieving user-defined vocabulary item names;
 parsing user input; and
 providing auto-completion of identifier portions which appear in the parsed user input, based at least in part on the dynamically retrieved user-defined vocabulary item names.

13. The computer-readable storage medium of claim 8, wherein the process further comprises displaying a tree representation of an XML schema, getting a user selection of multiple nodes of the tree representation, and generating a new vocabulary item for each of a plurality of the nodes of the user selection.

14. The computer-readable storage medium of claim 8, wherein the process further comprises receiving in one of the input fields a name of a collection of objects, and then automatically iterating over the collection of objects passed, thereby allowing a user to avoid writing logic in the input field which handles the objects individually.

15. A system comprising:
 at least one processor;
 a memory in operable communication with the processor;
 a set of rules listed in a listing order in the memory, each rule including at least one partial condition and at least one action, each rule having a respective identifier;
 a rule engine execution tracker having software which upon execution by the processor tracks execution of partial conditions at least in part by reading execution events;
 a rule execution store having software which upon execution by the processor stores rule identifiers with execution event data provided to the rule execution store by the rule engine execution tracker;
 a rule engine which emits execution events while executing rules in an execution order by matching inputs to partial conditions, evaluating partial conditions with matched inputs, and triggering execution of rule actions based on partial condition evaluation results, the execution order being different than the listing order; and
 a rule execution report which shows an execution history of the set of rules, including at least some of the rules listed in the listing order and at least some of the partial condition evaluation results.

16. The system of claim 15, wherein the execution events include at least three of the following: rule-execution-started, rule-execution-finished, rule-condition-evaluation-started, rule-condition-evaluation-finished, rule-condition-satisfied, rule-condition-not-satisfied, action-execution-started, action-execution-finished, result-update-triggered.

17. The system of claim 15, wherein the rule execution store maintains a data structure which maps an execution instance of a given rule to at least the input values that were matched to the one or more partial conditions of the rule during that execution instance.

18. The system of claim 15, wherein the rule engine executes rules in an execution order that is consistent with at least one of the following: a Rete execution order, a Rete-II execution order, a Rete-III execution order, a Rete-NT execution order, a Rete* execution order, a RetePlus execution order.

19. The system of claim 15, wherein the system is further characterized in at least two of the following ways:
 the system comprises a graphical user interface which upon execution obtains a user selection of an xpath which is part of a rule in the set of rules;
 the system comprises a graphical user interface which upon execution obtains a user selection of XML schema nodes to define a plurality of vocabulary items, at least one of which vocabulary items is used in one or more rules in the set of rules;

the system comprises software which upon receiving a text input sends the received text to a remote server for a validation which checks validity of the received text based at least in part on at least a portion of a user-designated vocabulary having associated data types, and the software obtains a validation result from the remote server, thereby validating input in the context of the data types;

at least one of the rules includes an SQL query; or at least one of the rules includes a condition, a condition-satisfied action which will be executed by the rule engine when the condition is satisfied, and a condition-not-satisfied action which will be executed by the rule engine when the condition is not satisfied.

20. The system of claim 15, wherein the system is further characterized in at least two of the following ways:

the set of rules is one of a plurality of sets of rules which includes at least one set marked by a user as active, and at least one other set of rules marked by the user as inactive;

the set of rules includes at least one rule marked by a user as active, and at least one other rule marked by the user as inactive;

the system comprises software which upon receiving text in a text input box of a graphical user interface distinguishes between single values, sets of values, and value ranges;

the system comprises software which upon determining that an input device focus is hovering over a vocabulary item displays a definition of the vocabulary item;

the system comprises software which imported the set of rules after the rules were authored in a word processor application; or the system comprises software which imported the set of rules after the rules were authored in a spreadsheet application.

* * * * *